US008756343B2

(12) United States Patent
Kobashi

(10) Patent No.: US 8,756,343 B2
(45) Date of Patent: Jun. 17, 2014

(54) DATA MANAGEMENT METHOD AND NODE APPARATUS

(75) Inventor: Hiromichi Kobashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 13/069,701

(22) Filed: Mar. 23, 2011

(65) Prior Publication Data

US 2011/0271135 A1 Nov. 3, 2011

(30) Foreign Application Priority Data

Apr. 30, 2010 (JP) ................................ 2010-104996

(51) Int. Cl.
*G06F 15/16* (2006.01)
*G06F 17/30* (2006.01)
*H04L 29/08* (2006.01)

(52) U.S. Cl.
CPC .... *G06F 17/30286* (2013.01); *G06F 17/30309* (2013.01); *G06F 17/30371* (2013.01); *H04L 29/0854* (2013.01)
USPC ............................ 709/248; 709/213; 709/236

(58) Field of Classification Search
CPC ................... G06F 17/30286; G06F 17/30309; G06F 17/30371; H04L 29/0854
USPC .................................. 709/212–216, 236, 248
See application file for complete search history.

(56) References Cited

U.S. PATENT DOCUMENTS

| 6,438,563 | B1 * | 8/2002 | Kawagoe ...................... 709/223 |
| 7,076,508 | B2 * | 7/2006 | Bourbonnais et al. ............... 1/1 |
| 7,627,611 | B2 * | 12/2009 | Gusciora ............................... 1/1 |
| 8,437,983 | B2 * | 5/2013 | Kobashi et al. ............... 702/176 |
| 8,458,451 | B2 * | 6/2013 | Shasha et al. ................. 713/150 |
| 8,589,360 | B2 * | 11/2013 | Li et al. .......................... 707/690 |
| 8,635,315 | B2 * | 1/2014 | Mendiratta et al. ........... 709/223 |
| 2002/0099787 | A1 * | 7/2002 | Bonner et al. ................. 709/216 |
| 2004/0010538 | A1 * | 1/2004 | Miller et al. .................. 709/201 |
| 2007/0055701 | A1 * | 3/2007 | Tse et al. ....................... 707/200 |
| 2008/0172423 | A1 | 7/2008 | Shinkai et al. |

FOREIGN PATENT DOCUMENTS

| JP | 2000-259473 | 9/2000 |
| WO | WO02/093420 | 11/2002 |

* cited by examiner

*Primary Examiner* — Patrice Winder
(74) *Attorney, Agent, or Firm* — Staas & Halsey LLP

(57) ABSTRACT

When receiving a predetermined command regarding an assigned key to a node apparatus, a history element is registered, which includes a first Logical Clock Value (LCV) at a first time the predetermined command was received, and a data value at a second time represented by the first LCV. When receiving a reference request to reference a data value at a third time represented by a specific LCV, a first marker is registered, which includes, as the specific LCV, a second LCV at a time when the reference request was received or a third LCV designated by the reference request, and further includes information concerning the reference request. When a fixed LCV in a system becomes not less than the specific LCV, a data value corresponding to the assigned key at the third time is identified from the history elements including first LCVs that are not greater than the specific LCV.

9 Claims, 34 Drawing Sheets

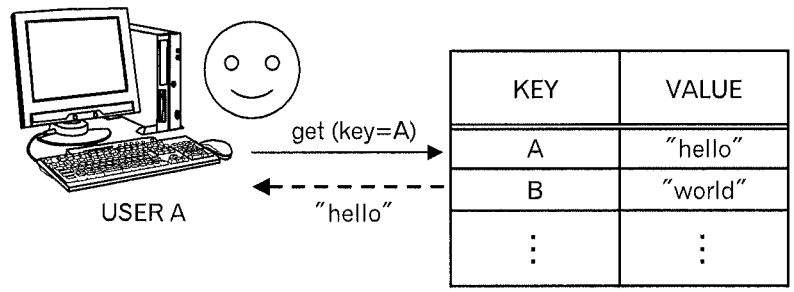
FIG.1
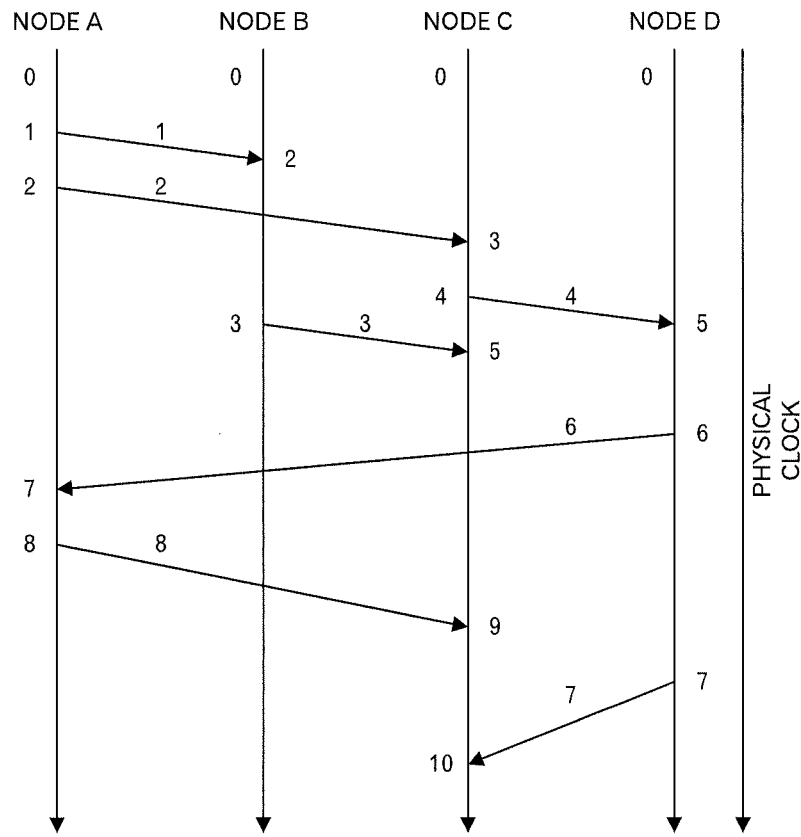
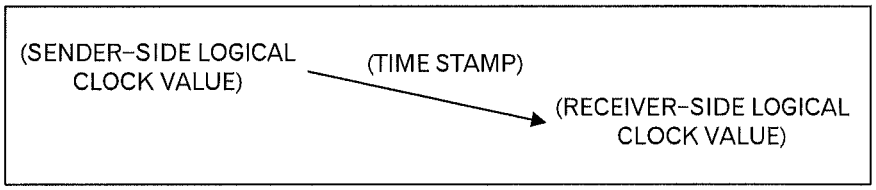
FIG.3

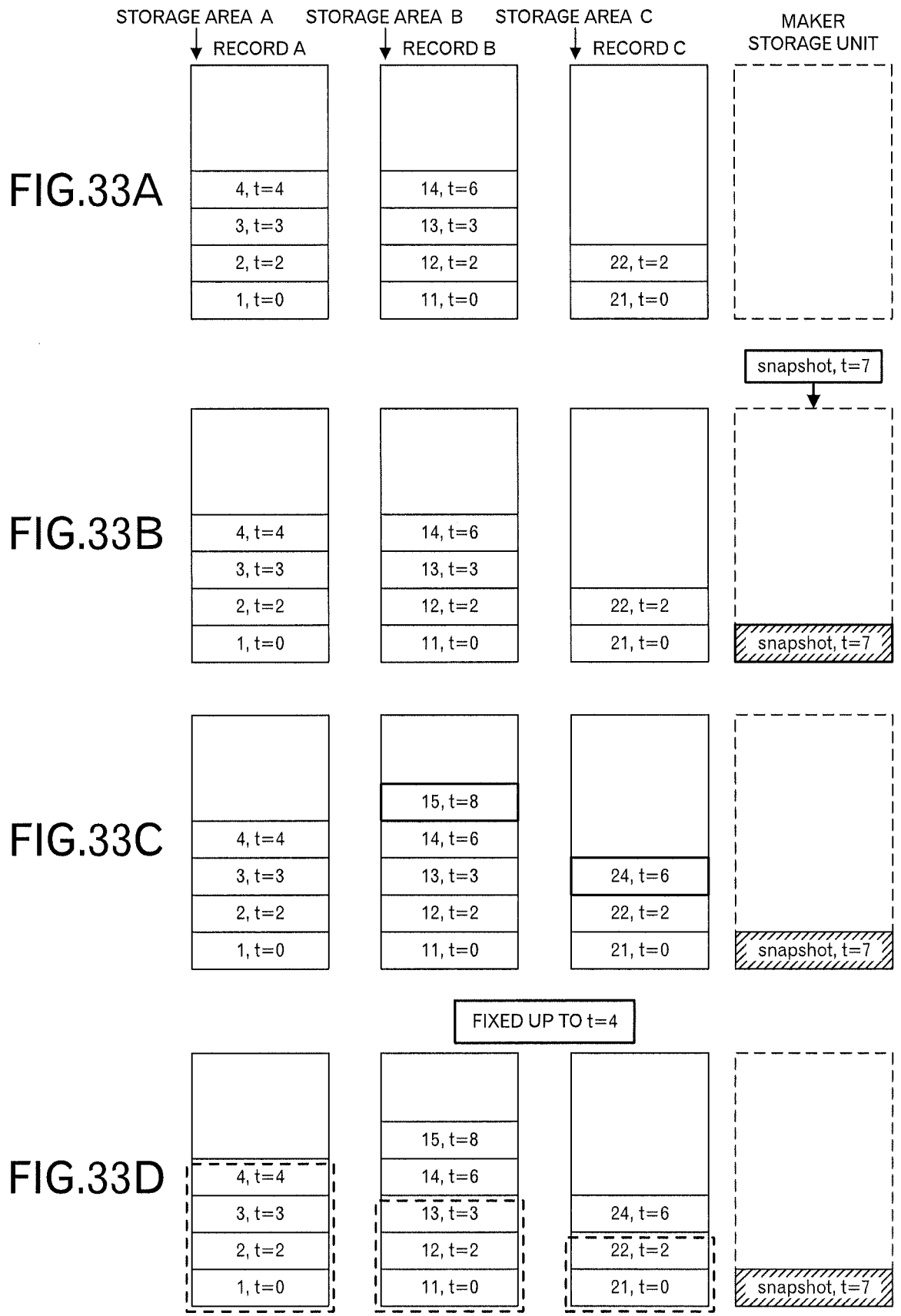

DATA MANAGEMENT METHOD AND NODE APPARATUS

CROSS-REFERENCE TO RELATED APPLICATIONS

This application is based upon and claims the benefit of priority of the prior Japanese Patent Application No. 2010-104996, filed on Apr. 30, 2010, the entire contents of which are incorporated herein by reference.

FIELD

The present technique relates to a data management technique in a distributed processing system.

BACKGROUND

In recent years, for example, in recent years, a key-value store method for managing data in key-and-value pairs has been known as a data storage method. FIG. 1 illustrates an example of a key-value store method. In the example in FIG. 1, records such as a record that includes key A and the value "hello" of the key A, and a record that includes key B and the value "world" of the key B are stored in a database. For example, when an inquiry (e.g. a get command "get (key=A)") about key A is transmitted to the database, the value "hello" of the key A is returned from the database.

Furthermore, a distributed-type key-value store method is also known. FIG. 2 illustrates an example of a distributed processing system that uses a distributed-type key-value store method. In the example in FIG. 2, the distributed processing system includes node A to node D, and these nodes cooperate with each other to carry out a processing together. Also, in the example in FIG. 2, it is assumed that node A is in charge of the record for key A, node B is in charge of the record for key B and so on. For example, in the case of acquiring the value of the key A, an inquiry about the key A (i.e. a get command "get (key=A)") is transmitted to one of the nodes. Here, it is assumed that an inquiry about the key A was transmitted to the node D. The node D receives the inquiry about the key A, searches for the node that is in charge of the key A, and transfers the inquiry to the node A, which is the node that is in charge of the key A. After receiving the inquiry about the key A, the node A reads out the value "hello" of the key A, from the database that the node A manages, and sends a response to the node D. Then, the node D receives the value "hello" of the key A from the node A and transmits that value to the user terminal. In this way, the user is able to obtain the desired value.

On the other hand, a method (for example, the Lamport algorithm) of expressing the order relationship of the processing between nodes using a logical clock in a distributed processing system is known. For example, as illustrated in FIG. 3, the node on the sender side sets the logical clock value at the time of transmission in a message as a time stamp and then transmits the message. The node on the receiver side calculates the new logical clock value by adding a predetermined value ("1" in FIG. 3) to the time stamp that was set in the message. Therefore, in the logical clock, time continues to advance, and time does not go backward (in other words, the logical clock value continues to advance, and that logical clock value is not reduced). In FIG. 3, a numerical value on the starting side of an arrow represents the logical clock value at a sender-side node, and a numerical value at the ending side of the arrow represents the logical clock value at a receiver-side node. In addition, the numerical value that is attached onto the arrow represents the time stamp that was set by the sender-side node (in other words, the logical clock value at the transmission time).

For example, in FIG. 3, when an event occurs at the node A and the logical clock value of the node A is 1, a message (a timestamp indicating 1) is transmitted from the node A to the node B. The logical clock value at the node B is 0 before reception of the message. After reception of the message, however, the node B determines that the logical clock value has increased to 1 since the timestamp included in the received message is 1 and thus uses, as a new logical clock value, a value (=2) obtained by adding 1 to the timestamp. Subsequently, when an event occurs at the node A and the logical clock value of the node A is 2, a message (a timestamp indicating 2) is transmitted from the node A to the node C. The logical clock value at the node C is 0 before reception of the message. After reception of the message, however, the node C determines that the logical clock value has increased to 2 since the timestamp included in the received message is 2 and thus uses, as a new logical clock value, a value (=3) obtained by adding 1 to the timestamp. Subsequently, when an event occurs at the node C and the logical clock value of the node C is 4, a message (a timestamp indicating 4) is transmitted from the node C to the node D. The logical clock value at the node D is 0 before reception of the message. After reception of the message, however, the node D determines that the logical clock value has increased to 4 since the timestamp included in the received message is 4 and thus uses, as a new logical clock value, a value (=5) obtained by adding 1 to the timestamp. When an event occurs at the node B and the logical clock value of the node B is 3, a message (a timestamp indicating 3) is transmitted from the node B to the node C. Although the timestamp included in the message received by the node C is 3, the logical clock value of the node C has increased to 4. Thus, the node C uses, as a new logical clock value, a value (=5) obtained by adding 1 to the logical clock value of the node C. Subsequently, when an event occurs at the node D and the logical clock value of the node D is 6, a message (a timestamp indicating 6) is transmitted from the node D to the node A. The logical clock value at the node A is 2 before reception of the message. After reception of the message, however, the node A determines that the logical clock value has increased to 6 since the timestamp included in the received message is 6 and thus uses, as a new logical clock value, a value (=7) obtained by adding 1 to the timestamp. Subsequently, when an event occurs at the node A and the logical clock value of the node A is 8, a message (a timestamp indicating 8) is transmitted from the node A to the node C. The logical clock value at the node C is 5 before reception of the message. After reception of the message, however, the node C determines that the logical clock value has increased to 8 since the timestamp included in the received message is 8 and thus uses, as a new logical clock value, a value (=9) obtained by adding 1 to the timestamp. When an event occurs at the node D and the logical clock value of the node D is 7, a message (a timestamp indicating 7) is transmitted from the node D to the node C. Although the timestamp included in the message received by the node C is 7, the logical clock value of the node C has increased to 9. Thus, the node C uses, as a new logical clock value, a value (=10) obtained by adding 1 to the logical clock value of the node C. As described above, each node performs the processing while changing the logical clock value.

Furthermore, some systems in distributed processing systems are applied eventual consistency as the data consistency model. Eventual Consistency is a consistency model that does not guarantee immediate consistency among all the replicas in a certain data store but does guarantee that they will all eventually reach the same value.

For example, FIG. 4 illustrates a distributed processing system in which eventual consistency has been applied. In the example in FIG. 4, it is assumed that the distributed processing system includes nodes A to G, and the node A is in charge of the record for key A. For example, in order to set a value for the key A, a user B operates the user terminal and inputs a set command "set (key=A, value=Y)", after which the user terminal receives that input from the user B and sends the command to node F. Also, for example, in order to acquire the value of the key A, a user A operates the user terminal and inputs a get command "get (key=A)", after which the user terminal receives the input from the user A and sends the get command to node C. Incidentally, for each command, at the instant that the command reaches a node, the node assigns a time stamp. In the example in FIG. 4, t=9 is assigned to the get command, and t=7 is assigned to the set command. In other words, in terms of the time stamp, the set command is older than the get command.

After that, as illustrated in FIG. 5, the node C searches for the node in charge of the key A, and transfers the get command to the node A, which is the node in charge of the key A. Similarly, the node F searches for the node in charge of the key A, and transfers the set command to the node A, which is the node in charge of the key A. Here, as illustrated in FIG. 5, it is assumed that a delay due to some reasons occur in the set command, so the get command arrives at the node A before the set command. In this case, as illustrated in FIG. 6, "X", which was originally set, is acquired as the value of the key A. After that, when the set command arrives at the node A, the value of the key A is updated from "X" to "Y". However, when the user A tries to acquire the value of the key A again after a certain period of time has elapsed, it is then possible to acquire the updated value "Y". In this way, in a distributed processing system in which eventual consistency has been applied, as long as the newest value can finally be obtained, it is acceptable even if the newest value cannot be obtained a certain point in time.

However, as described above, from the point of view of eventual consistency, it is considered to be acceptable as long as the consistency in data eventually is obtained. Therefore, there was no viewpoint as to what point in time data consistency was obtained (or in other words, when data was "fixed"). Therefore, in distributed processing systems that have applied eventual consistency and a distributed-type key-value store method, it is impossible to identify how far data has been fixed at the present time in the overall system, and it is also impossible to know multiple data values (i.e. plural data values) at a certain period of time, while the logical clock value continues to advance.

In other words, in a distributed processing system managing a data value corresponding to each of plural keys, it is impossible to grasp the plural data values at a certain time point.

SUMMARY

A data management method according to one aspect of this technique is a data management method executed by a node apparatus managing a data value corresponding to each of a plurality of keys. Moreover, this data management method includes: upon receipt of a predetermined command relating to an assigned key that is a key of which the node apparatus is in charge among a plurality of keys, first registering, into a first storage unit, a history element including a first logical clock value at a first time when the predetermined command was received, and a data value at a second time represented by the first logical clock value or information concerning the predetermined command; upon receipt of a reference request to reference a data value at a third time represented by a specific logical clock value, second registering, into the first storage unit or a second storage unit different from the first storage unit, a first marker that includes, as the specific logical clock value, a second logical clock value at a fourth time when the reference request was received or a third logical lock value designated by the reference request, and further includes information concerning the reference request; and upon detecting that a fixed logical clock value in a system to which the node apparatus belongs becomes equal to or greater than the specific logical clock value included in the first marker stored in the first storage unit or the second storage unit, identifying a data value corresponding to the assigned key at the third time from the history elements including first logical clock values that are equal to or less than the specific logical clock value in the first storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram to explain a key-value store method;

FIG. 3 is a diagram to explain a conventional logical clock;

FIGS. 33A to 33D are diagrams to explain a processing of an entire distributed processing system relating to the fourth embodiment;

DESCRIPTION OF EMBODIMENTS

Embodiment 1

Figure 2:
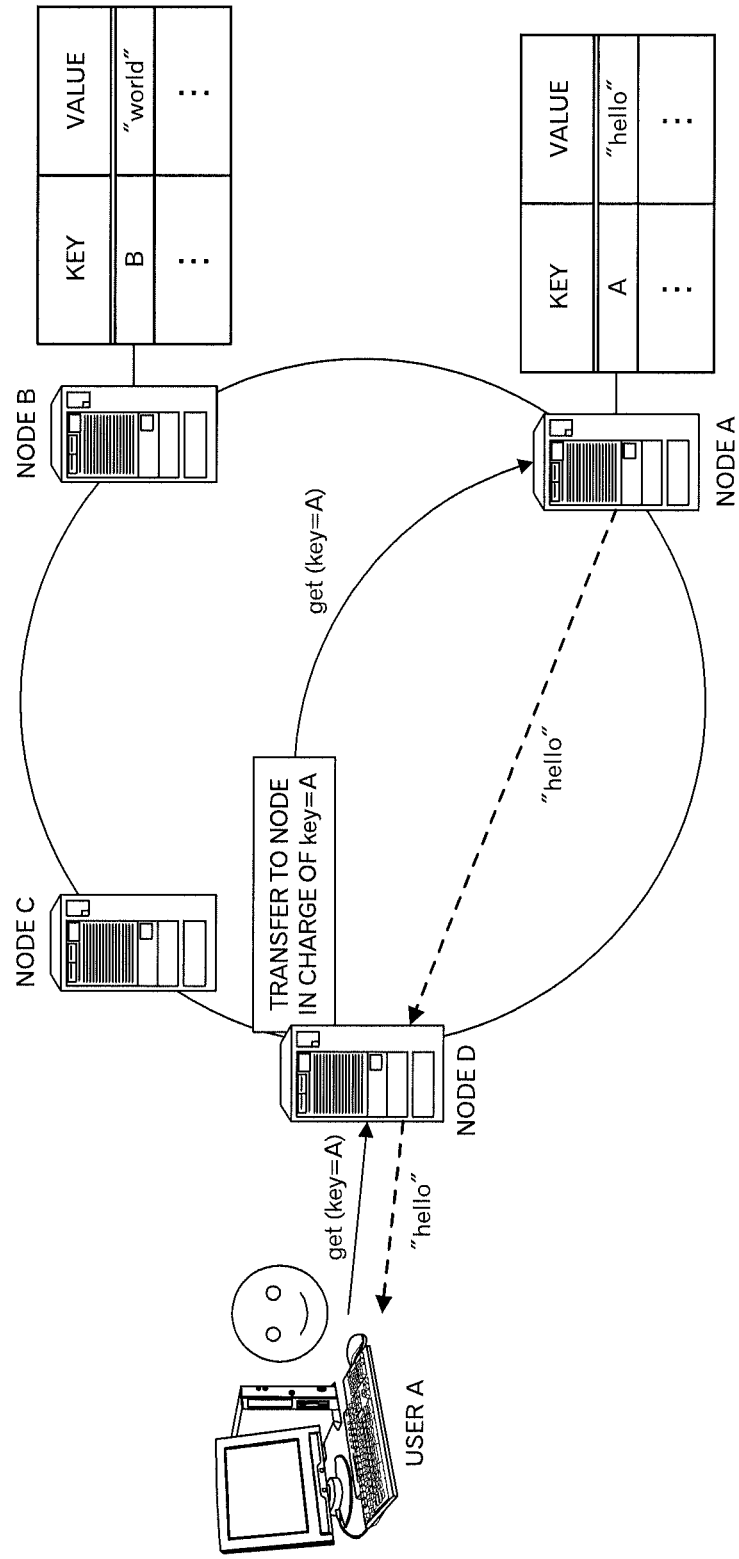
FIG. 2 is a diagram illustrating an example of a distributed processing system, which employs the distributed-type key-value store method.
Figure 4:
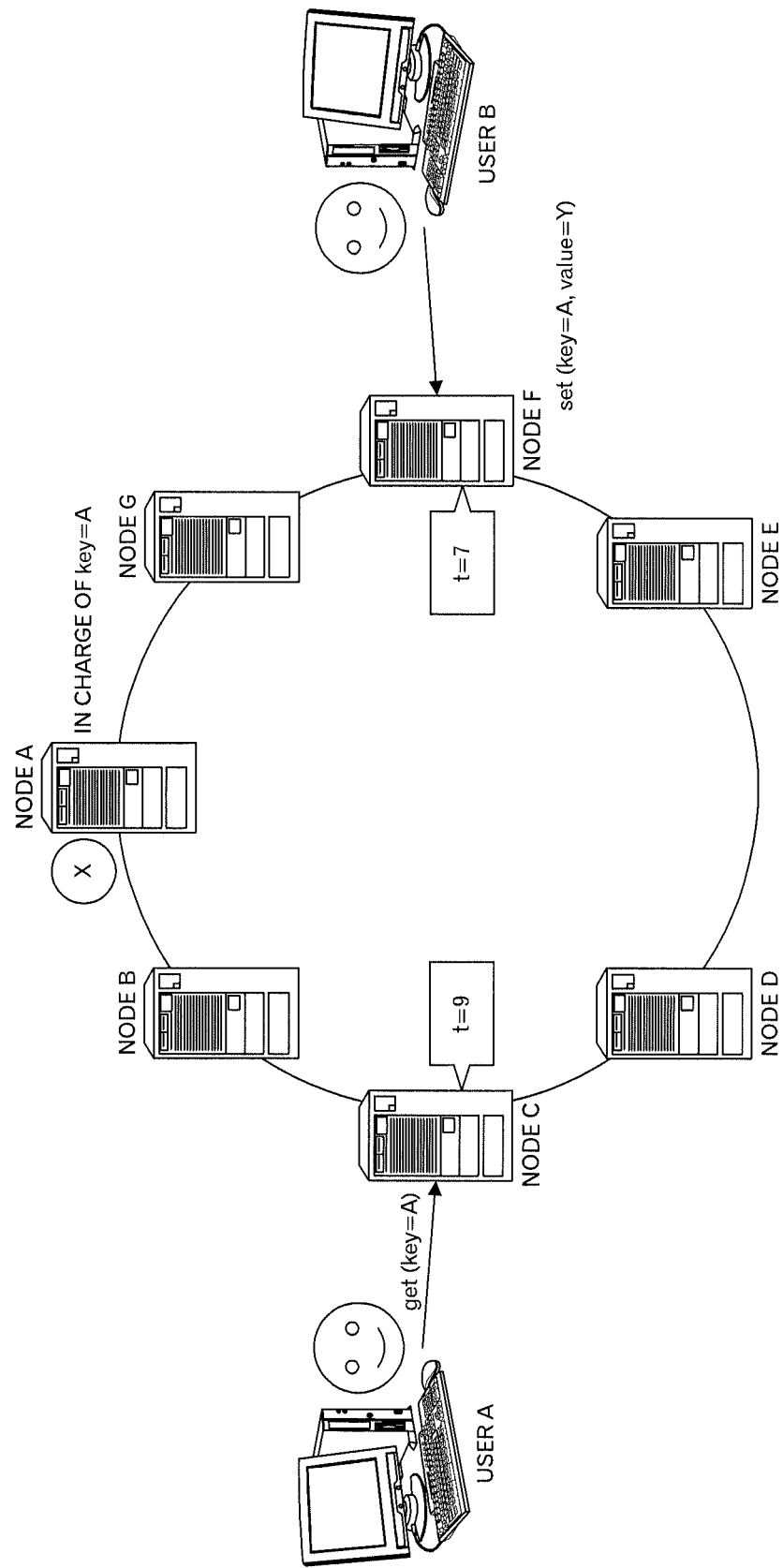
FIG. 4 is a diagram to explain an operational example of a conventional distributed processing system applying eventual consistency.
Figure 5:
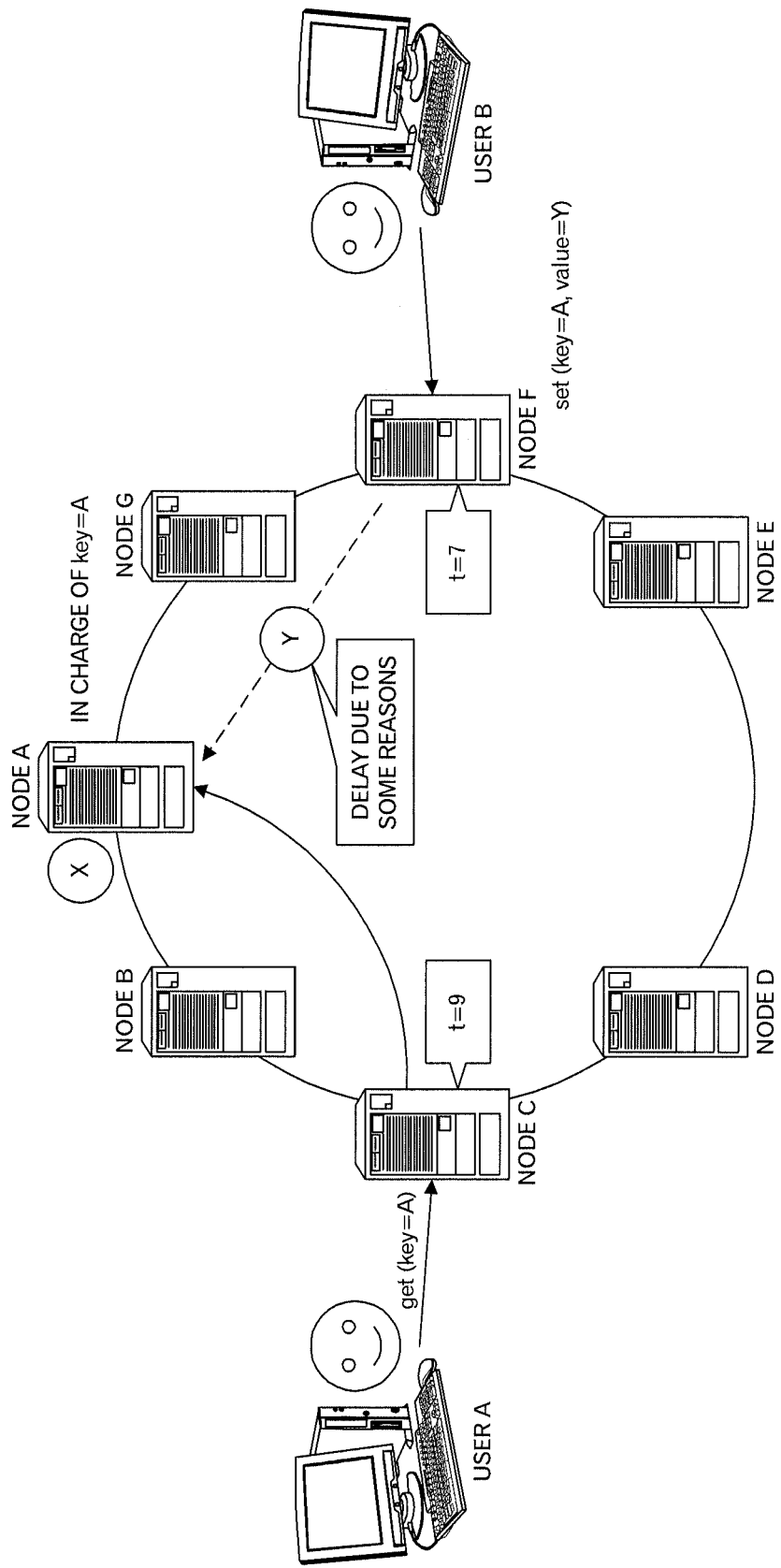
FIG. 5 is a diagram to explain an operational example of a conventional distributed processing system applying eventual consistency.
Figure 6:
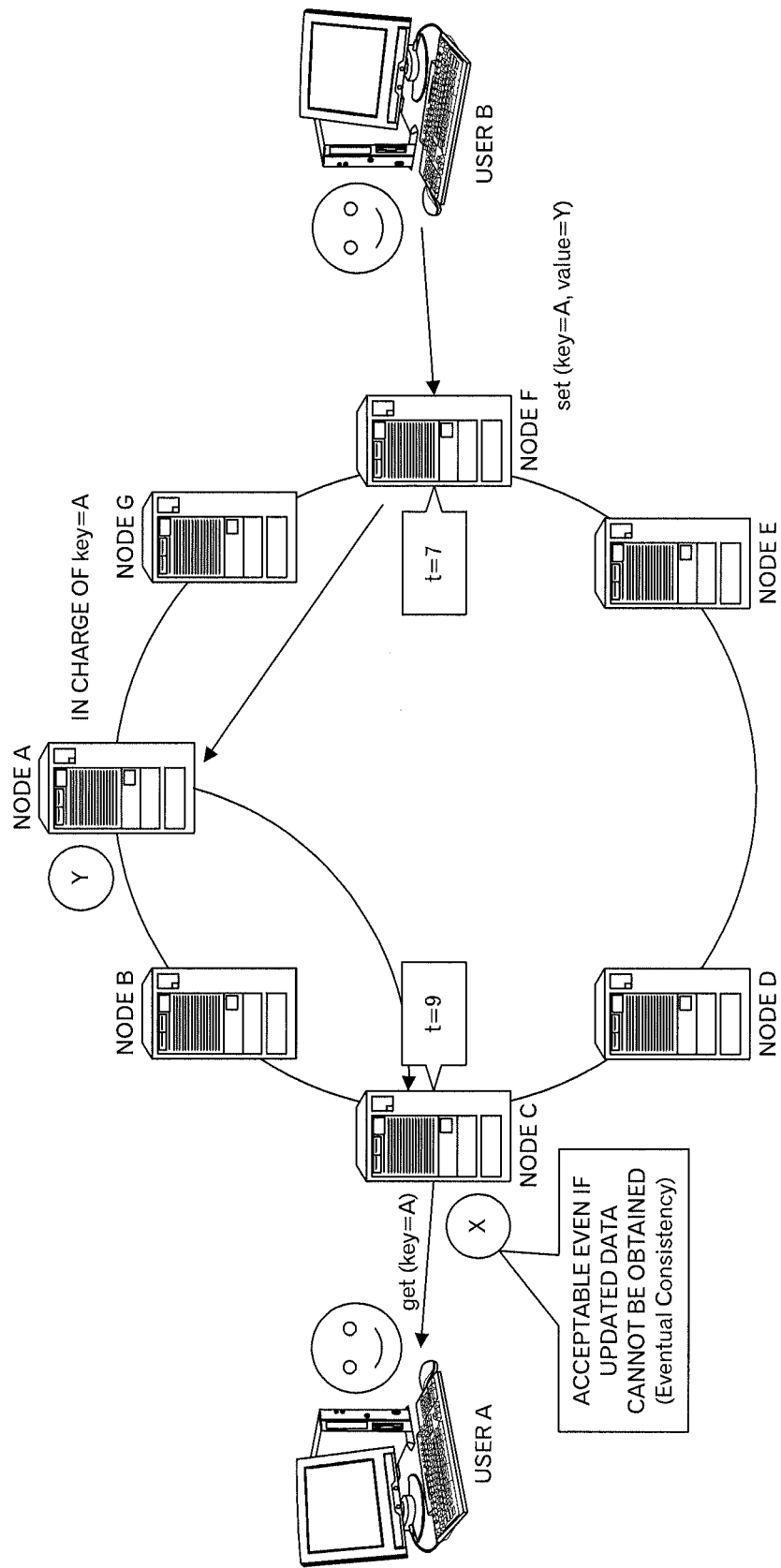
FIG. 6 is a diagram to explain an operational example of a conventional distributed processing system applying eventual consistency.
Figure 7:
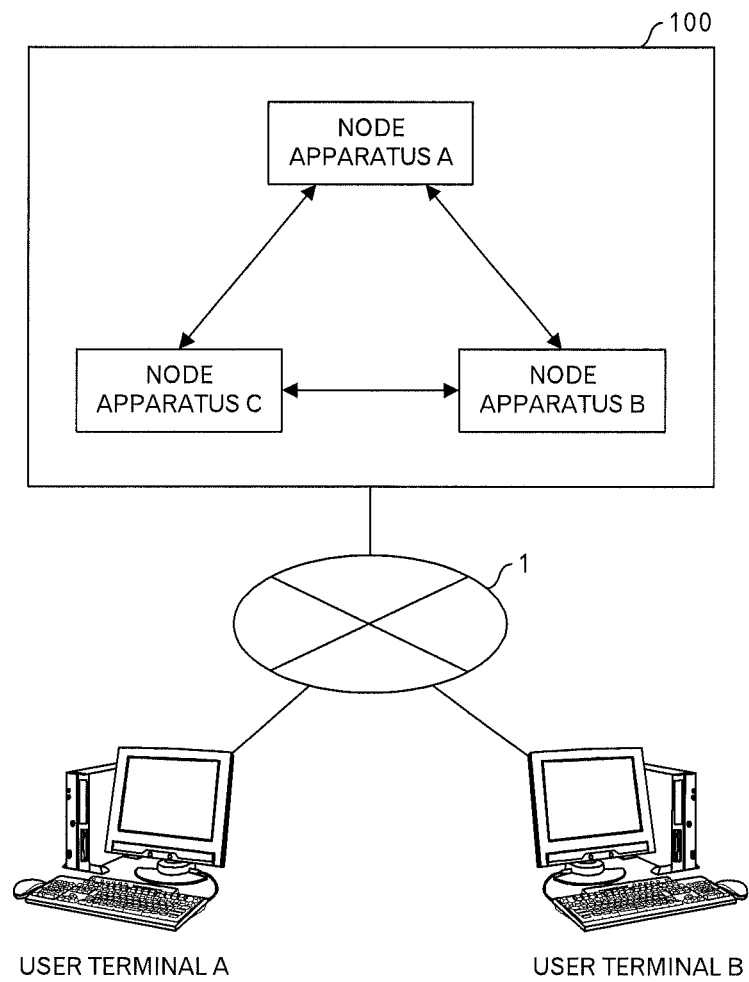
FIG. 7 is a diagram illustrating a configuration of a distributed processing system relating to a first embodiment.

A first embodiment will be explained using FIG. 7 to FIG. 15. FIG. 7 illustrates the configuration of the system relating to this first embodiment. For example, a distributed processing system 100 that includes plural node apparatuses (node apparatuses A to C in FIG. 7) and plural user terminals (user terminal A and B in FIG. 7) are connected to a network 1 such as the Internet. Incidentally, this distributed processing system 100 is a system in which eventual consistency and a distributed-type key-value store method are applied, and a distributed framework (not illustrated in FIG. 7) for realizing eventual consistency and the distributed-type key-value store method is applied in each node apparatus that is included in the distributed processing system 100. FIG. 7 illustrates an example in which there are three node apparatuses and two user terminals, however, the number of node apparatuses and the number of user terminals are not limited to these values.

Figure 8:
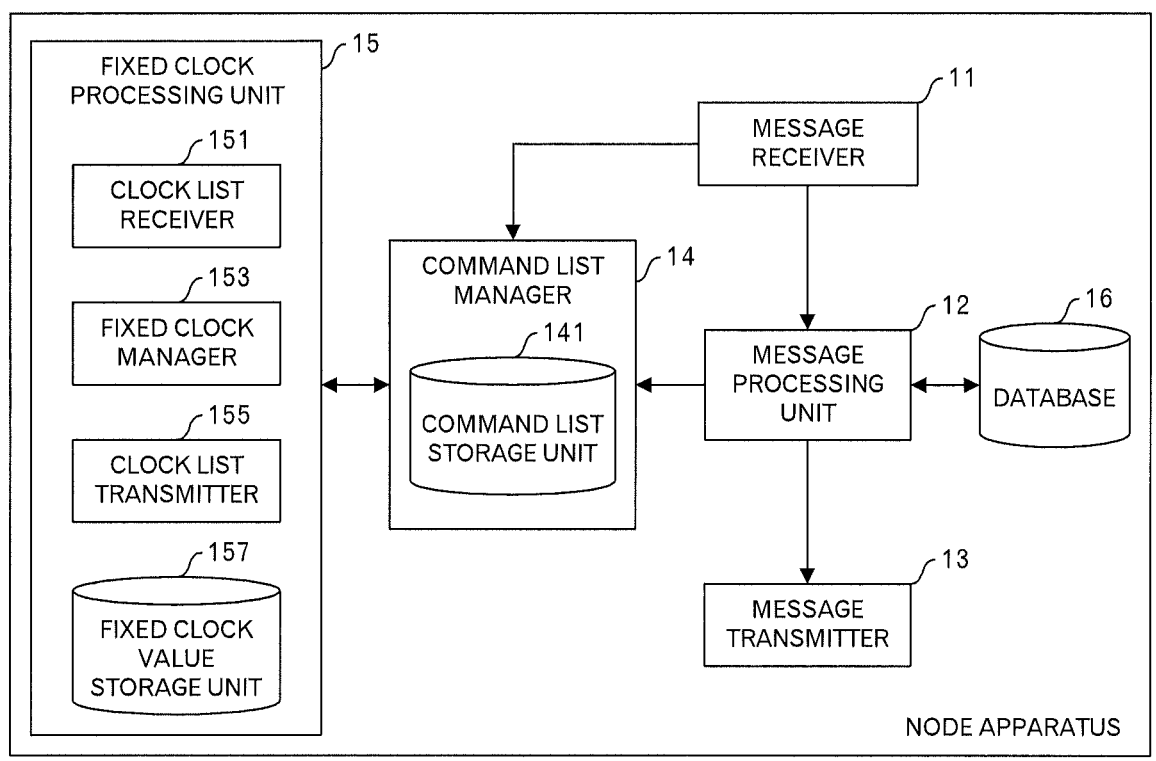
FIG. 8 is a functional block diagram of a node apparatus in the first embodiment.

FIG. 8 is a functional block diagram of a node apparatus in this first embodiment. A node apparatus relating to this first embodiment has a message receiver 11, a message processing unit 12, a message transmitter 13, a command list manager 14, a fixed clock processing unit 15 and a database 16. Incidentally, the command list manager 14 manages a command list storage unit 141 that stores a command list that includes pairs of identifiers of commands (for example, get command, set command) that its own node apparatus received, and logical clock values at the times the commands were received. The fixed clock processing unit 15 has a clock list receiver 151, a fixed clock manager 153, a clock list transmitter 155, and a fixed clock value storage unit 157. The database 16 stores the key of which its own node apparatus is in charge (hereafter, called the assigned key), and the data value corresponding to that assigned key.

The message receiver 11 receives commands from the user terminals, and messages from other node apparatuses within the distributed processing system 100. Incidentally, when the message receiver 11 has received a new command from a user terminal, the message receiver 11 outputs the command information to the message processing unit 12 or command list manager 14. The message processing unit 12 uses the data stored in the database 16 to carry out a processing according to the command and/or message received by the message receiver 11, and stores the processing result as necessary in the database 16. When the processing is complete, the message processing unit 12 outputs a processing completion notification to the command list manager 14. The message transmitter 13 sends the processing results from the message processing unit 12 to the user terminal that is the command source, and sends messages to other node apparatuses in the distributed processing system 100.

The command list manager 14 updates the command list in the command list storage unit 141 according to notifications from the message receiver 11 and message processing unit 12, and calculates, from the command list, the fixed clock value (hereafter is also called the first fixed clock value) of its own node. For example, a get command is received when the logical clock value is "10", a set command is received when the logical clock value is "14", a get commend is received when the logical clock value is "16"; and when the processing of these commands is not yet complete, data such as command list=[10: get, 14: set, 16: get] is stored in the command list storage unit 141. Incidentally, the value obtained by subtracting "1" from the smallest logical clock value that is included in the command list becomes the first fixed clock value. For example, in the case of a command list as described above, the smallest logical clock value that is included in the command list is "10", so the first fixed clock value becomes "9" (=10-1). When the command list is empty, the logical clock value of its own node apparatus at the present point in time becomes the first fixed clock value.

In addition, the clock list receiver 151 of the fixed clock processing unit 15 receives a clock list from other node apparatuses in the distributed processing system 100. A clock list is data that is circulated among node apparatuses in the distributed processing system 100. Pairs of identification information for a node apparatus and the first fixed clock value of that node apparatus are included in the clock list. For example, when the first fixed clock value of the node apparatus A is "10", the first fixed clock value of the node apparatus B is "5" and the first fixed clock value of the node apparatus C is "7", the clock list={node A: 10, node B: 5, node C: 7}.

The fixed clock manager 153 of the fixed clock processing unit 15 uses the first fixed clock value that was calculated by the command list manager 14 and updates the clock list that was received by the clock list receiver 151, identifies the fixed clock value (hereafter called the fixed clock value of the entire system or second fixed clock value) of the overall distributed processing system 100 from the updated clock list, and stores the value in the fixed clock value storage unit 157. The clock list transmitter 155 transmits the clock list that was updated by the fixed clock manager 153 to the other node apparatuses in the distributed processing system 100.

Figure 9A:
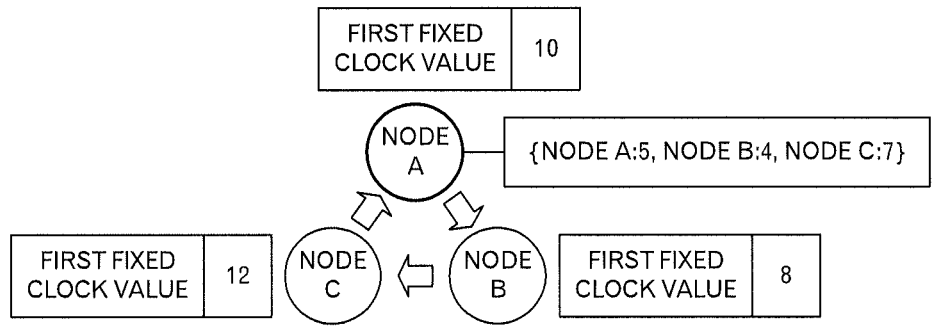
FIGS. 9A to 9C are diagrams to explain a processing of an entire distributed processing system relating to the first embodiment.
Figure 9B:
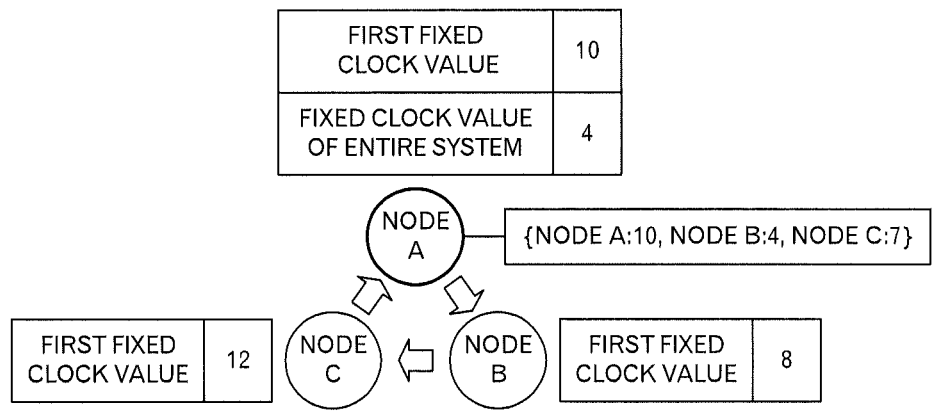

Next, the overall processing of the distributed processing system 100 will be explained using FIGS. 9A to 9C and FIGS. 10A and 10B. For example, the node apparatus that generates the clock list when the distributed processing system 100 is booted up is predetermined, and after the system has started properly, that node apparatus acquires information about the node apparatuses in the distributed processing system 100 (for example, the total number of node apparatuses, identification information for the node apparatuses, and the like). The node apparatus then uses the acquired information to generate a clock list, and starts circulation of the clock list. Here, the clock list is circulated in the order "node apparatus A→node apparatus B→node apparatus C", and after the node apparatus C, the clock list returns again to the node apparatus A. As illustrated in FIG. 9A, in the distributed processing system 100, the first fixed clock value of the node apparatus A is "10", the first fixed clock value of the node apparatus B is "8" and the first fixed clock value of the node apparatus C is "12". Here, for example, when the clock list={node A: 5, node B: 4, node C: 7} has gone around to the node apparatus A, the node apparatus A updates the clock list according to its own first fixed clock value (=10). The bold circle in FIG. 9A represents the node apparatus that has the clock list (this is the same hereafter). Therefore, as illustrated in FIG. 9B, the clock list is updated to the contents {node A: 10, node B: 4, node C: 7}. The smallest first fixed clock value (=4) included in the updated clock list is identified as the fixed clock value of the entire system. The identified fixed clock value of the entire system (=4) is stored into the fixed clock value storage unit 157 of the node apparatus A. After that, the clock list is transmitted to the node apparatus B.

Figure 9C:
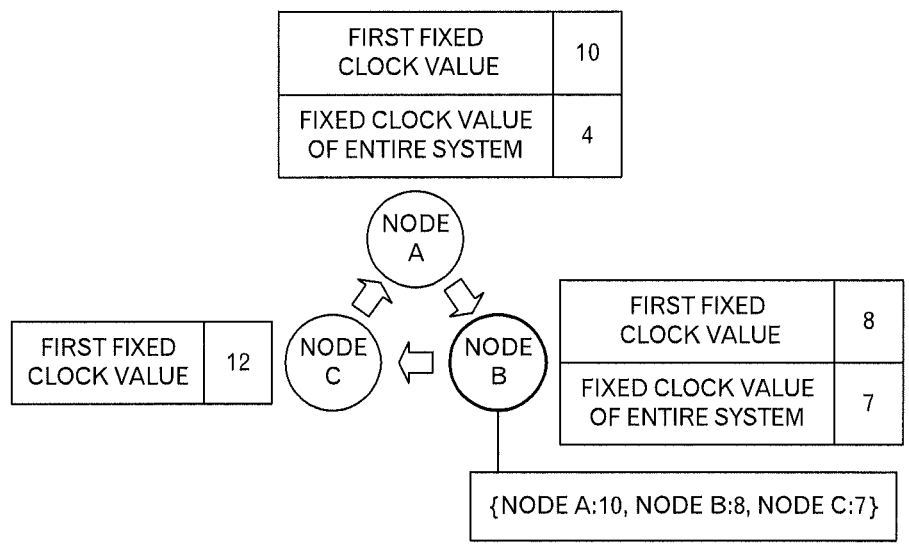

The node apparatus B receives the clock list={node A: 10, node B: 4, node C: 7}, and updates the clock list according to its own first fixed clock value (=8). In doing so, as illustrated in FIG. 9C, the clock list is updated to the contents {node A: 10, node B: 8, node C: 7}. The smallest first fixed clock value (=7) included in the updated clock list is then identified as the fixed clock value of the entire system. The fixed clock value of the entire system (=7) is stored into the fixed clock value storage unit 157 of the node apparatus B. After that, the clock list is transmitted to the node apparatus C.

Figure 10A:
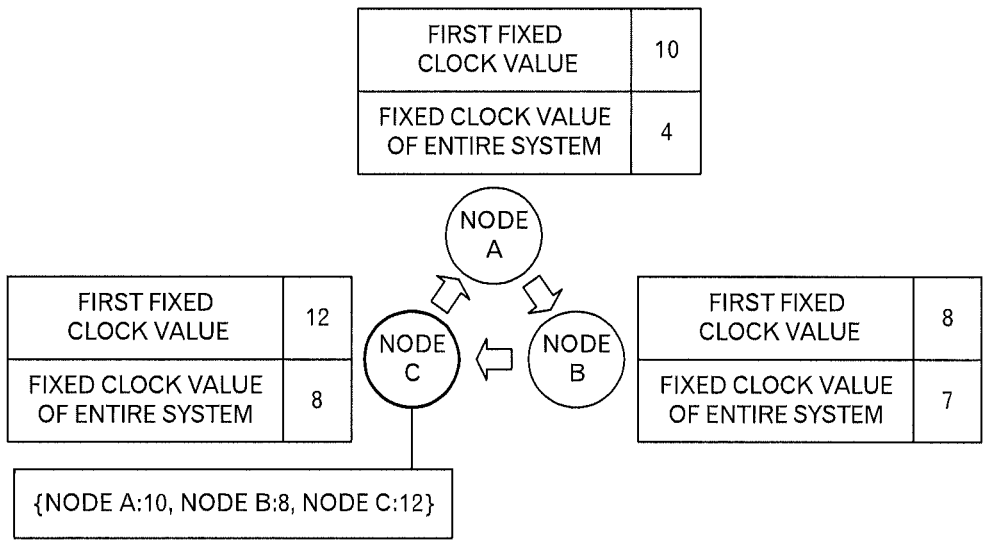
FIGS. 10A and 10B are diagrams to explain a processing of the entire distributed processing system relating to the first embodiment.

Then, the node apparatus C receives the clock list={node A: 10, node B: 8, node C: 7}, and updates the clock list according to its own first fixed clock value (=12). In doing so, as illustrated in FIG. 10A, the clock list is updated to the contents {node A: 10, node B: 8, node C: 12}. After that, the smallest first fixed clock value (=8) that is included in the clock list is identified as the fixed clock value of the entire system. The identified fixed clock value (=8) of the entire system is stored into the fixed clock value storage unit 157 of the node apparatus C. The clock list is then transmitted to the node apparatus A.

Figure 10B:
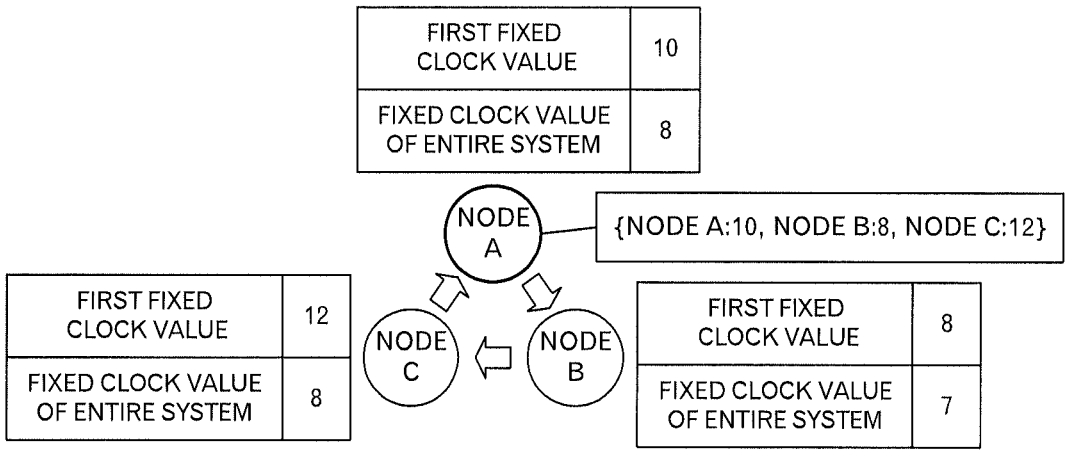

Then, as illustrated in FIG. 10B, the node apparatus A receives the clock list {node A: 10, node B: 8, node C: 12} and updates the clock list according to its own first fixed clock value. Here, the first fixed clock value of the node apparatus A is still "10". Therefore, the contents of the clock list stay the same as before the update. In such as case, the clock list update process can be omitted. After that, the smallest fixed clock value (=8) that is included in the clock list is identified as the fixed clock value of the entire system. The identified fixed clock value of the entire system (=8) is stored into the fixed clock value storage unit 157 of the node A.

In this way, each of the node apparatuses in the distributed processing system 100 updates the clock list to the most updated state when the clock list comes around to that node apparatus, and identifies the fixed clock value of the entire system in the distributed processing system 100. That node apparatus then transfers the clock list to the next node apparatus.

Incidentally, FIGS. 9A to 9C and FIGS. 10A and 10B illustrate an example in which the first fixed clock value does not change at the node apparatuses A to C, however, in the distributed processing system 100, the processing for commands is also carried out in parallel. Therefore, the command list is sequentially updated, and the first fixed clock value gradually changes. For example, a case where the first fixed clock value changes will be explained using FIG. 11. In order to simplify the explanation in the example of FIG. 11, it is assumed that there are only the node apparatuses A and B.

Figure 11:
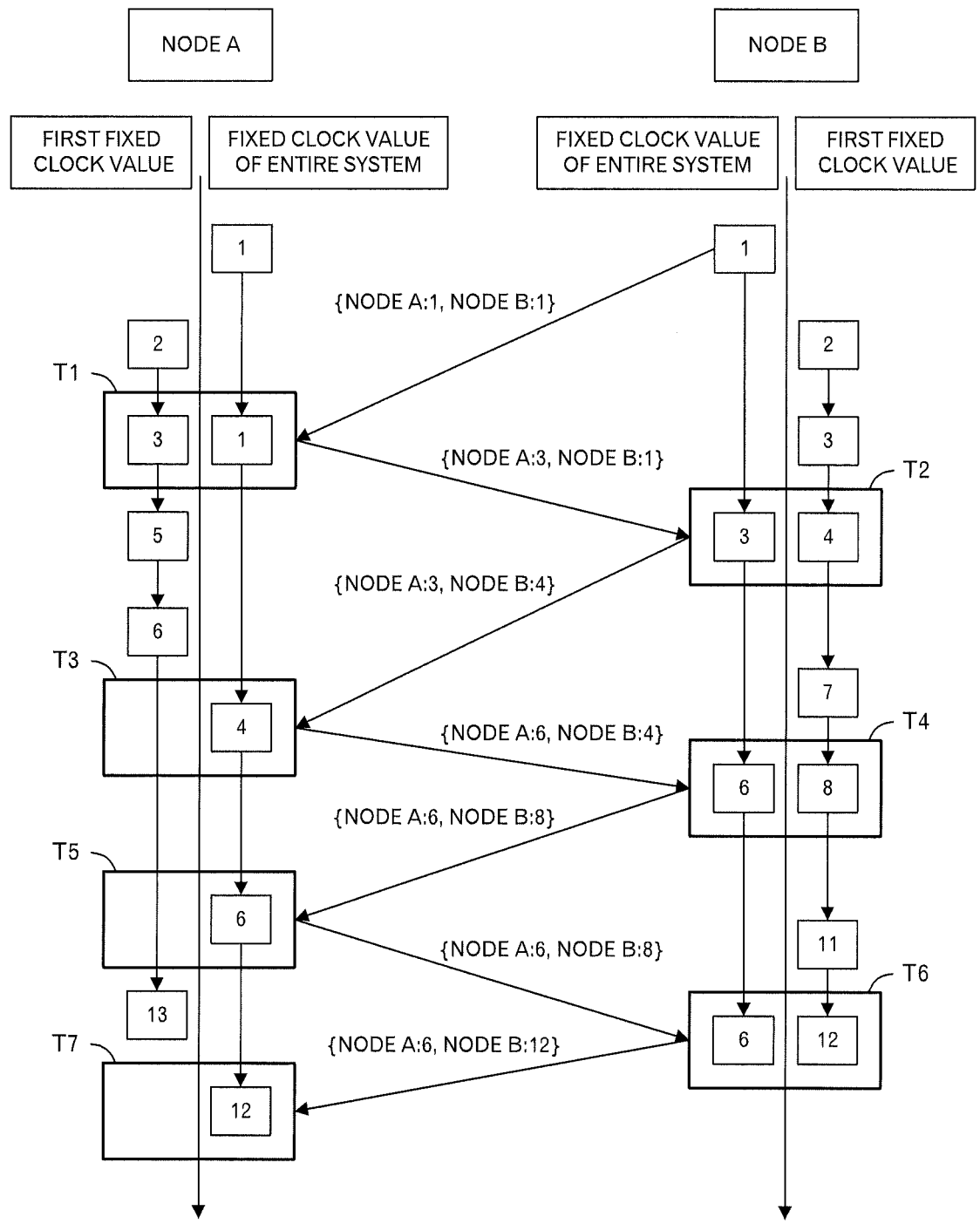
FIG. 11 is a diagram illustrating the sequence for the operations by node apparatus A and B.

First, the node apparatus A receives the clock list={node A: 1, node B: 1} from the node apparatus B (FIG. 11: T1). At this time, the first fixed clock value of the node apparatus A is "3", and after the node apparatus A updates the clock list, the clock list={node A: 3, node B: 1}. By doing so, the first fixed clock value (=1) of the node apparatus B becomes the smallest first fixed clock value in the clock list Therefore, in stage T1, "1" is identified as the fixed clock value of the entire system. After that, the clock list is transmitted from the node apparatus A to the node apparatus B.

Then, the node apparatus B receives the clock list={node A: 3, node B: 1} from the node apparatus A (FIG. 11: T2). At this time, the first fixed clock value of the node apparatus B is "4", and after the node apparatus B updates the clock list, the clock list={node A: 3, node B: 4}. As a result, the first fixed clock value (=3) of the node apparatus A becomes the smallest first fixed clock value in the clock list. Therefore, in stage T2, "3" is identified as the fixed clock value of the entire system. After that, the clock list is transmitted from the node apparatus B to the node apparatus A.

Then, the node apparatus A receives the clock list={node A: 3, node B: 4} from the node apparatus B (FIG. 11: T3). At this time, the first fixed clock value of the node apparatus A is "6", so after the node apparatus A updates the clock list, the clock list={node A: 6, node B: 4}. As a result, the first fixed clock value (=4) of the node apparatus B becomes the smallest first fixed clock value in the clock list. Therefore, in stage T3, "4" is identified as the fixed clock value of the entire system. After that, the clock list is transmitted to the node apparatus B from the node apparatus A.

Then, the node apparatus B receives the clock list={node A: 6, node B: 4} from the node apparatus A (FIG. 11: T4). At this time, the first fixed clock value of the node apparatus B is "8" so after the node apparatus B updates the clock list, the clock list={node A: 6, node B: 8}. As a result, the first fixed clock value (=6) of the node apparatus A becomes the smallest first fixed clock value in the clock list. Therefore, in stage T4, "6" is identified as the fixed clock value of the entire system. After that, the clock list is transmitted from the node apparatus B to the node apparatus A.

Then, the node apparatus A receives the clock list={node A: 6, node B: 8} from the node apparatus B (FIG. 11: T5). At this time, the first fixed clock value of the node apparatus A is still "6", so the contents of the clock list do not change. However, in stage T3, the smallest first fixed clock value was "4". However, because, in stage T4, the clock list was updated by the node apparatus B, the smallest first fixed clock value is changed to "6" in stage T5. Therefore, in stage T5, "6" is identified as the fixed clock value of the entire system. After that, the clock list is transmitted to the node apparatus B from the node apparatus A.

Then, the node apparatus B receives the clock list={node A: 6, node B: 8} from the node apparatus A (FIG. 11: T6). At this time, the first fixed clock value of the node apparatus B has become "12", so after the node apparatus B updates the clock list, the clock list={node A: 6, node B: 12}. In stage T6, the smallest first fixed clock value (=6) has not changed from the stage T4, so the fixed clock value of the entire system remains "6". After that, the clock list is transmitted from the node apparatus B to the node apparatus A.

The node apparatus A then receives the clock list={node A: 6, node B: 12} from the node apparatus B (FIG. 11: T7). At this time, the first fixed clock value of the node apparatus A has become "13", so after the node apparatus A has updated the clock list, the clock list={node A: 13, node B: 12}. As a result, the first fixed clock value (=12) of the node apparatus B becomes the smallest first fixed clock value in the clock list. Therefore, in stage T7, "12" is identified as the fixed clock value of the entire system.

In this way, the fixed clock value of the entire system changes according to changes in the first fixed clock value. In FIG. 11, an example was illustrated in which there were only two node apparatuses A and B, however, the processing by each node apparatus is the same even when there are three or more node apparatuses.

By carrying out the processing described above, it is possible to identify the fixed clock value of the entire system of the distributed processing system 100, and thus it is possible to know up to where data has been fixed as the overall distributed processing system 100.

Next, a processing flow of the node apparatus relating to this first embodiment will be explained. First, the processing flow when a command is received will be explained using FIG. 12. First, the message receiver 11 receives a new command from a user terminal (FIG. 12: step S1), and identifies the logical clock value at the time the command was received. The message receiver 11 then notifies the message processing unit 12 and command list manager 14 of command information that includes the command identifier and logical clock value at the time the command was received.

Then, when the command list manager 14 receives the command information from the message receiver 11, the command list manager 14 registers the pair of the command identifier and logical clock value at the time the command was received, into the command list (step S3). In other words, every time a command is received, the pair of the command identifier and logical clock at the time the command was received is registered into the command list.

In addition the message processing unit 12 receives the command information from the message receiver 11, and carries out a processing according to the received command. Because the message processing unit 12 is the same as a conventional message processing unit, no more will be explained about it. Then, the processing ends.

Figure 13:
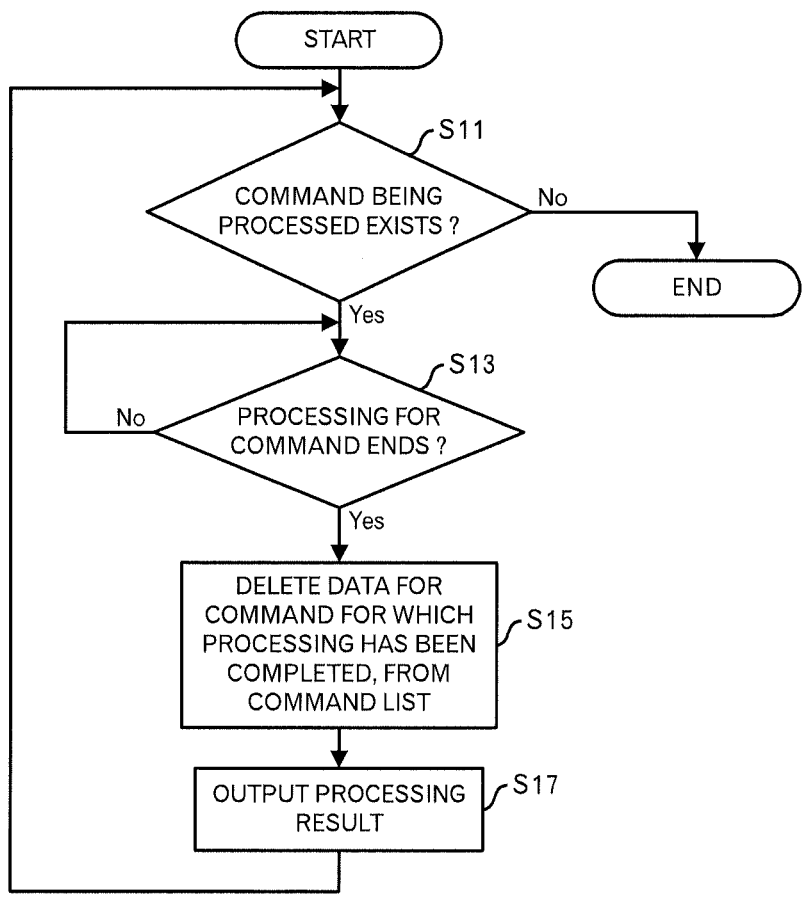
FIG. 13 is a diagram depicting a processing flow of the node apparatus when the command has been processed.

Next, the processing flow when the processing for a command is completed will be explained using FIG. 13. For example, the command list manager 14 searches the command list that is stored in the command list storage unit 141, and determines whether or not there are any commands that are being processed (FIG. 13: step S11). For example, when the command list is empty, the command list manager 14 determines that there are no commands being processed, and when there is even just one pair registered of a command identifier and logical clock value at the time that command was received, the command list manager 14 determines that there is a command being processed. When the command list is empty, or in other words, when it is determined that there are no commands being processed (step S11: NO route), the processing ends.

On the other hand, when it is determined that there is a command being processed (step S11: YES route), the command list manager 14 determines whether or not the processing for any one command is completed (step S13). For example, when the message processing unit 12 carries out a processing according to the received command in parallel with the processing flow in FIG. 13, and the processing is completed, the message processing unit 12 sends a processing completion notification, which includes information such as the identifier of the command for which the processing is completed, to the command list manager 14. Therefore, when a processing completion notification has been received, the command list manager 14 determines that the processing is completed. When any processing completion notification has not been received (step S13: NO route), the command list manager 14 waits until the processing completion notification is received.

When it is determined that the processing for anyone command is completed (step S13: YES route), the command list manager 14 deletes the pair of the identifier of the command for which the processing completed and the logical clock value at the time that command was received, from the command list in the command list storage unit 141 (step S15).

When the processing by the message processing unit 12 is completed, the message transmitter 13 transmits the processing result to the command source (i.e. the transmission source of the command) (step S17). After that, the processing returns to the processing at the step S11 and the processing is repeated until the command list is empty. In the processing flow in FIG. 13, it is possible to exchange the order of the steps S15 and S17, and it is also possible to execute these steps in parallel.

Figure 12:
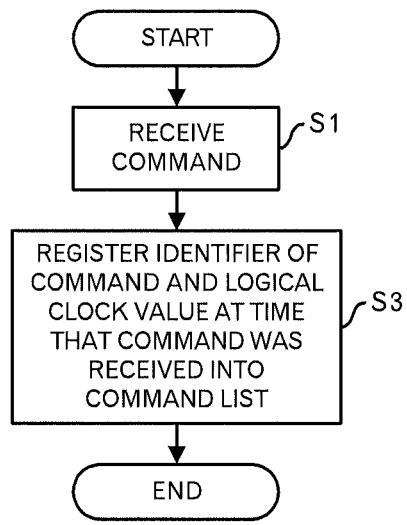
FIG. 12 is a diagram depicting a processing flow of the node apparatus when a command is received.

By carrying out the processing illustrated in FIG. 12 and FIG. 13, it is possible to adequately manage information about the commands during the processing.

Figure 14:
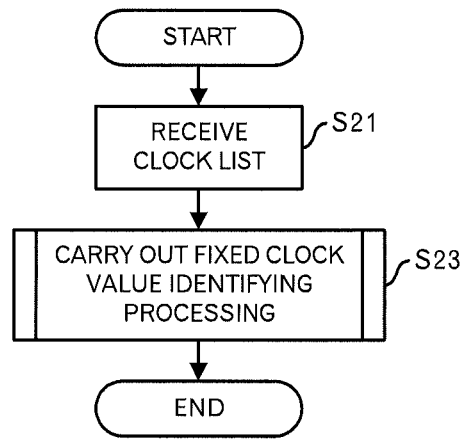
FIG. 14 is a diagram depicting a processing flow of the node apparatus when the clock list is received.
Figure 15:
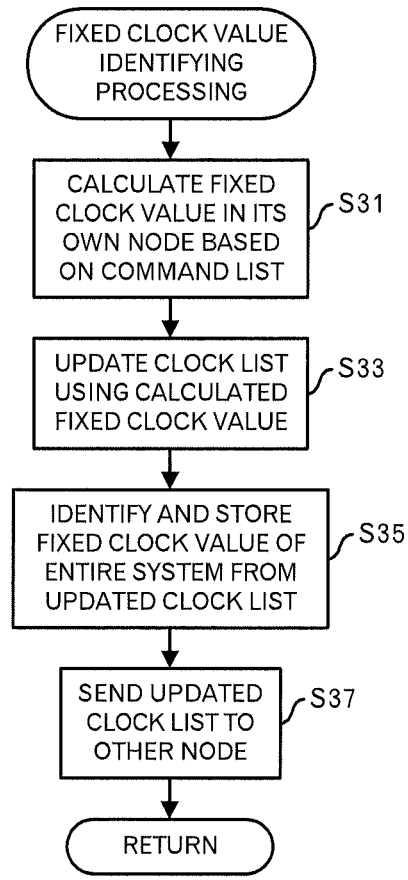
FIG. 15 is a diagram depicting a processing flow of a fixed clock identifying processing.

Next, the processing flow when receiving the clock list will be explained using FIG. 14 and FIG. 15. First, the clock list receiver 151 receives the clock list from another node apparatus in the distributed processing system 100 (FIG. 14: step S21), and outputs the received clock list to the fixed clock manager 153.

The fixed clock manager 153 then receives the clock list from the clock list receiver 151, and performs a processing for identifying the fixed clock value (step S23). This processing for identifying the fixed clock value will be explained using FIG. 15.

First, the fixed clock manager 153 instructs the command list manager 14 to calculate its own first fixed clock value at the present time. In response to the instruction from the fixed clock manager 153, the command list manager 14 calculates the current first fixed clock value from the command list that is stored in the command list storage unit 141 (FIG. 15: step S31). More specifically, the command list manager 14 calculates the value obtained by subtracting "1" from the smallest logical clock value that is included in the command list as the first fixed clock value at the current time. The logical clock value has the characteristic of constantly increasing, it is possible to consider it is fixed up to (the previous smallest logical clock value that is included in the command list–1). For example, when "10" is the smallest logical clock value that is included in the command list, "9" (=10−1) is calculated as the first fixed clock value. After all processing has been completed, the command list may become empty. When the command list is empty, the logical clock value at the present time is calculated as the first fixed clock value. For example, as described in the description of the background art, each node apparatus carries out the processing while exchanging the logical clock value. In other words, even when the command list is empty, the logical clock value advances by receiving a message from another node. Therefore, when the command list is empty, the logical clock value at the present time becomes the first fixed clock value. After that, the command list manager 14 outputs the calculated first fixed clock value to the fixed clock manager 153.

When the fixed clock manager 153 then receives the first fixed clock value from the command list manager 14, the fixed clock manager 153 updates the clock list using that first fixed clock value (step S33). In other words, the fixed clock manager 153 rewrites its own first fixed clock value that is included in the clock list with the first fixed clock value that is calculated at the step S31.

After that, the fixed clock manager 153 identifies the fixed clock value of the entire system from the updated clock list, and stores that value into the fixed clock value storage unit 157 (step S35). More specifically, the fixed clock manager 153 identifies the smallest first fixed clock value among the first fixed clock values included in the updated clock list as the fixed clock value of the entire system.

The fixed clock manager 153 then instructs the clock list transmitter 155 to transmit the updated clock list. In response to the instruction from the fixed clock manager 153, the clock list transmitter 155 transmits the updated clock list to the next node apparatus in the distributed processing system 100 (step S37). The processing then ends. As a method of circulating the clock list, the order may be determined beforehand (for example, is in ascending order or descending order of the node ID number), or the clock list can be moved around at random. Moreover, for example, the node apparatus having the smallest first fixed clock value may be identified among the other node apparatuses in the distributed processing system 100, and the clock list may be transmitted to the identified node apparatus. The fixed clock value of the entire system is the smallest first fixed clock value that is included in the clock list. Therefore, preferential movement of the clock list to the node apparatus having the smallest first fixed clock value enables to immediately reflect the updated first fixed clock value, when the first fixed clock value of that node apparatus is updated.

The number of clock lists does not necessarily need to be one, and it is possible to circulate plural clock lists. For example, by increasing the number of clock lists, the time interval between receiving a clock list is shortened, so the time interval for executing the processing illustrated in FIG. 14 and FIG. 15 is also shortened. Therefore, it is possible to obtain a more detailed understanding of the fixed clock value of the entire system. Furthermore, when circulating plural clock lists, the method of moving the clock lists around is arbitrary.

By performing the processing described above, it is possible to identify the fixed clock value of the entire distributed processing system 100. In addition, when the fixed clock value of the entire system can be grasped, it is possible to know up to where data have been fixed in the overall system.

Embodiment 2

Figure 16:
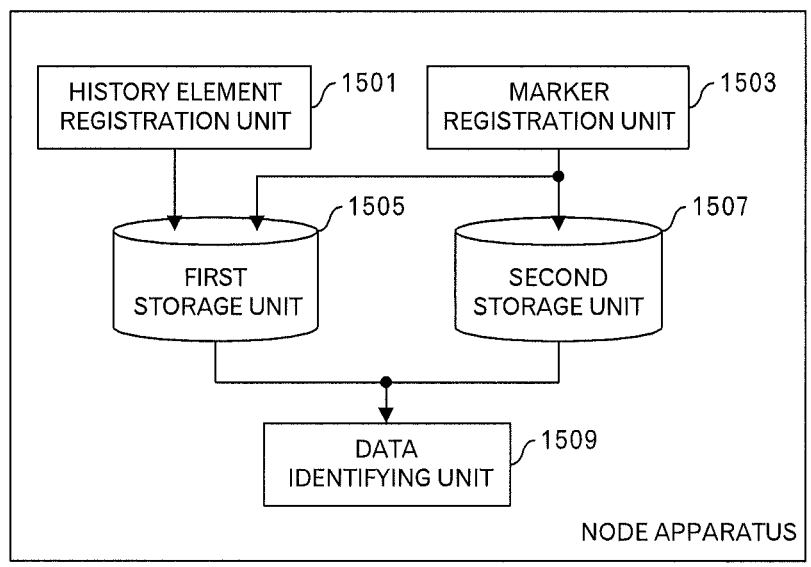
FIG. 16 is a functional block diagram of a node apparatus in a second embodiment.

Next, a second embodiment will be explained. First, FIG. 16 illustrates a functional block diagram of a node apparatus relating to this second embodiment. A node apparatus relating to this embodiment is a node apparatus that is included in a distributed processing system (for example, a distributed processing system that implements a distributed-type key-value store method) that distributedly manages respective data values corresponding to plural keys in plural node apparatuses. Moreover, a node apparatus in this embodiment has a history element registration unit 1501, a marker registration unit 1503, a first storage unit 1505, a second storage unit 1507 and a data identifying unit 1509. When receiving a certain command relating to an assigned key, the history element registration unit 1501 registers a history element relating to that command into the first storage unit 1505. When receiving a reference request for plural records, the marker registration unit 1503 registers a marker that includes information concerning the reference request and the like into the first storage unit 1505 or second storage unit 1507. The data identifying unit 1509 performs a processing using the data that is stored in the first storage unit 1505 and/or second storage unit 1507.

Figure 17:
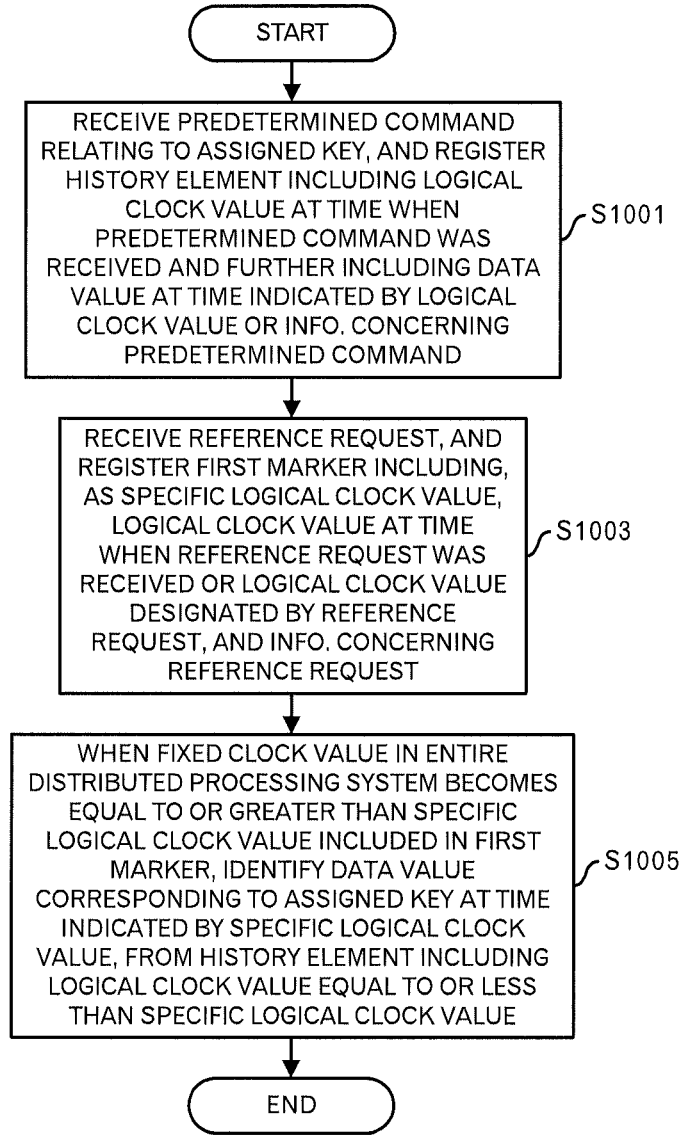
FIG. 17 is a diagram depicting a processing flow in the second embodiment.

Next, a processing by the node apparatus illustrated in FIG. 16 is explained using FIG. 17. First, when a predetermined command relating to an assigned key is received, the history element registration unit 1501 registers a history element, which includes the logical clock value at the time when the predetermined command was received and a data value at the time represented by the logical clock value, or information concerning the predetermined command (for example, information concerning the operation designated by the command), into the first storage unit 1505 (FIG. 17: step S1001). When a reference request for referencing plural data values at the time represented by a specific logical clock value is received, the marker registration unit 1503 registers a first marker, which includes, as the specific logical clock, the logical clock value at the time when the reference request was received, or a logical clock value designated by the reference request, and also includes information concerning the reference request into the first storage unit 1505 or second storage unit 1507 (step S1003). By registering the first marker in this way, in the gradual change of the fixed clock value of the entire distributed processing system, it is possible to know at what timing to find a data value. Incidentally, the fixed clock value for the entire distributed processing system can be identified by carrying out the processing explained in the first embodiment.

When the fixed clock value of the entire distributed processing system becomes equal to or greater than the specific logical clock value that is included in the first marker in the first storage unit 1505 or second storage unit 1507, the data identifying unit 1509 identifies the data value that corresponds to the assigned key, at the time represented by the specific logical clock value from the history elements that include the logical clock values that are equal to or less than the specific logical clock value (step S1005). By the fixed clock value of the entire distributed processing system, which is equal to or greater than the specific logical clock value, it is possible to determine that the data value at the time represented by the specific logical clock value has been fixed. Then, since the data value at the time represented by the specific logical clock value is identified from a suitable history element, it is possible to grasp the data value at the time represented by the specific logical clock value.

Embodiment 3

Figure 18A:
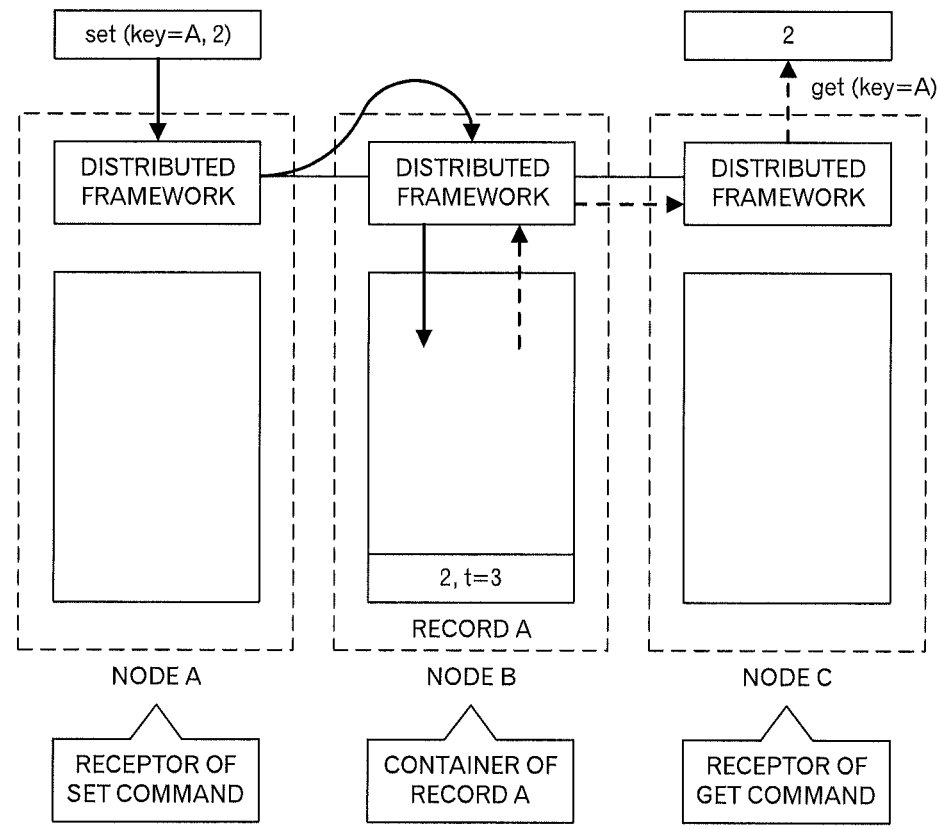
FIGS. 18A and 18B are diagrams to explain an entire configuration of a distributed processing system relating to a third embodiment.
Figure 18B:
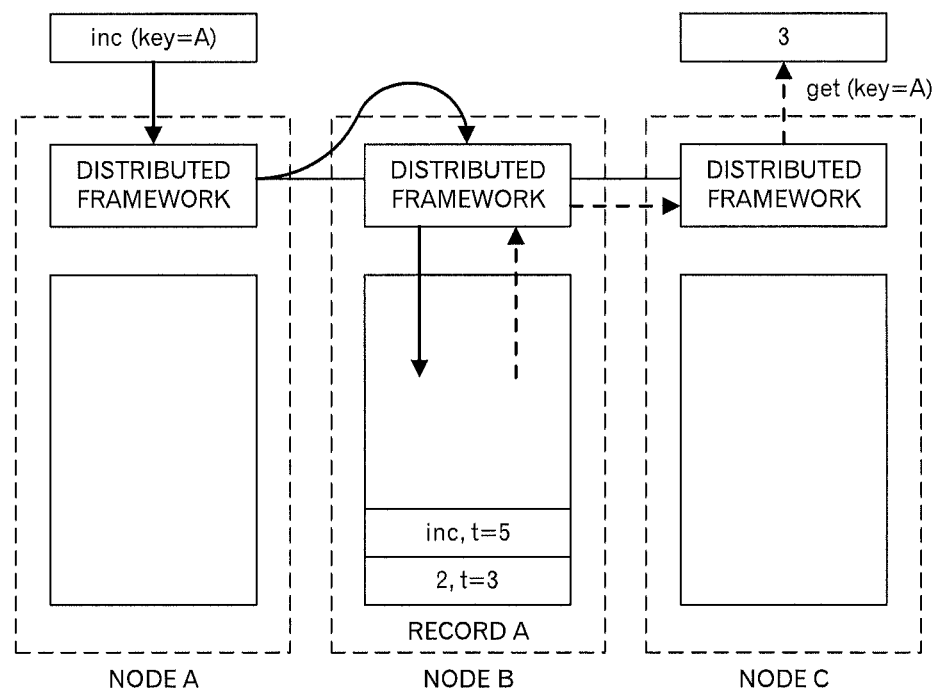

Next, a third embodiment will be explained. First, the overall configuration of the distributed processing system in this embodiment will be briefly explained. In this embodiment, for example, as illustrated in FIGS. 18A and 18B, a history element is stored for each received command. In FIGS. 18A and 18B, the distributed processing system includes node apparatuses A to C that are in charge of the processing, and a distributed framework is implemented in each node apparatus. In FIGS. 18A and 18B, the node apparatus B is in charge of the record for key A (hereafter, called record A). For example, as illustrated in FIG. 18A, when the node apparatus A receives a set command "set (key=A, 2)", the distributed framework assigns a time stamp to the set command. Here, the time stamp t=3 is assigned. After that, the node apparatus A searches for the node that is in charge of the key A, and by cooperation of the distributed frameworks, the set command is transferred to the node apparatus B, which is the node in charge of the key A. In doing so, the history element {2, t=3} of the set command is registered into the database of the node apparatus B. Here, the history element {2, t=3} represents that at t=3, "2" was set as the data value of the key A. The node apparatus that received a command may be called a receptor, and the node apparatus that is in charge of a certain record may be called a container. In the example in FIG. 18A, the node apparatus A is the receptor of the set command, and the node apparatus C is the receptor of the get command. In addition, the node apparatus B is a container for the record A.

After that, for example, when the node apparatus C receives a get command "get (key=A)", the distributed frameworks cooperate with each other, and the node apparatus C acquires a data value of the key A from the database of the node apparatus B, which is in charge of the key A, and outputs the acquired value to the requesting source of the get command. Here, since the history element {2, t=3} is registered into the database of the node apparatus B, "2" is acquired as the data value of the key A. Also as for the get command, the distributed framework assigns a time stamp at the time when the get command was received.

After that, for example, as illustrated in FIG. 18B, when the node apparatus A receives an inc command "inc (key=A)", the distributed framework similarly assigns a time stamp to the inc command. Here, it is assumed that a time stamp t=5 is assigned. In addition, it is assumed that the inc command is a command for incrementing the data value of the key A by "1". After that, the node apparatus A searches for the node apparatus that is in charge of the key A, the distributed frameworks cooperate with each other, and the inc command is transferred to the node apparatus B, which is the node in charge of the key A. In doing so, the history element {inc, t=5} of the inc command is registered into the database of the node apparatus B. Here, the history element {inc, t=5} represents that an inc command was received at time t=5.

After that, for example, when the node apparatus C again receives the get command "get (key=A)", the distributed frameworks cooperate with each other, and the data value for the key A is acquired from the database of the node apparatus B, which is in charge of the key A, and then the node apparatus C outputs the acquired value to the requesting source of the get command. Here, because {2, t=3} and {inc, t=5} are registered in the database of the node apparatus B as history elements, the data value (=2) at the time t=3 is incremented by "1", and the incremented value (=3) is acquired as the data value of the key A. Incidentally, although an example of an inc command was explained above, history elements that include information concerning the operation (i.e. command operation) designated in the command and a time stamp are similarly registered for other operations as well. In this way, the history elements of the commands are stored, in record units, in order of the time stamp, and for example, when a get command is received, the history elements are used to calculate the data value at the current time and return the calculated result.

Figure 19:
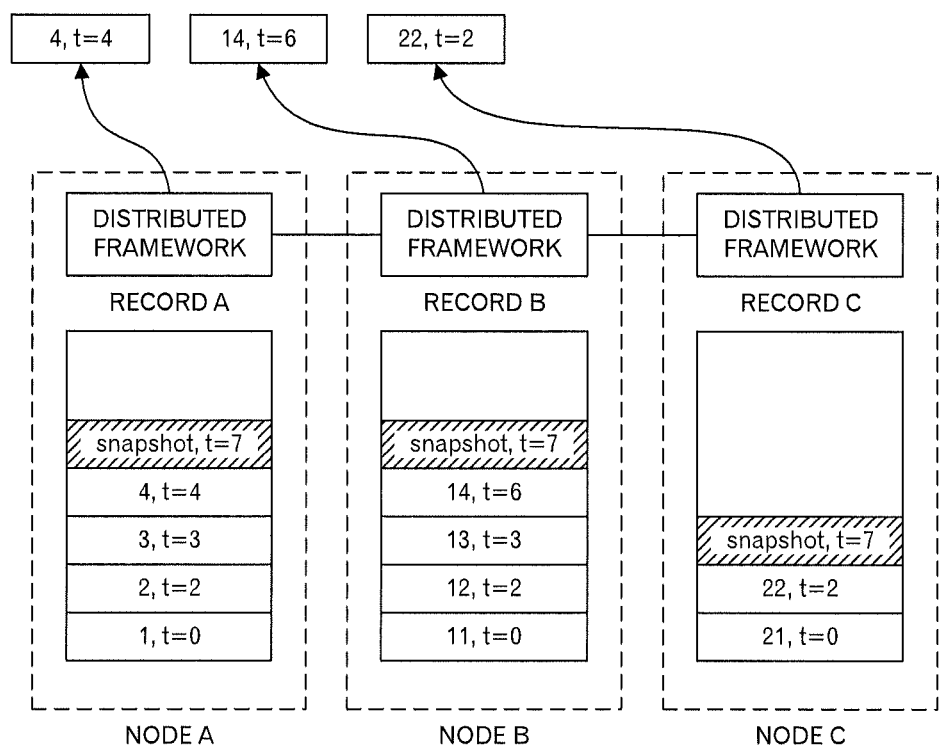
FIG. 19 is a diagram depicting an example in a case where a marker is registered.

In this embodiment, when a reference request to reference plural data values at a certain time is received from a user terminal, a marker, which includes information (hereinafter, referred to snapshot) concerning the reference request and the logical clock at the time the reference request was received or the logical clock that is designated by the reference request, is registered. For example, as depicted in FIG. 19, when a reference request to reference plural data values at the time t=7 is received, the marker {snapshot, t=7} is registered into the database of each node apparatus. In FIG. 19, it is assumed that the node apparatus A is the container of the record A, the node apparatus B is the container of the record B and the node apparatus C is the container of the record C. The respective node apparatuses identify the fixed clock value of the entire distributed processing system by carrying out the processing explained in the first embodiment, and determines whether or not the fixed clock value of the entire system is equal to or greater than the logical clock value included in the marker. For example, when the marker {snapshot, t=7} is registered, the node apparatus determines whether or not the fixed clock value for the entire system is "7" or greater. When the fixed clock value of the entire system is less than "7", there is no fixed data value at the time t=7. On the other hand, when the fixed clock value of the entire system is "7" or greater, there is already a fixed data value at the time t=7. Therefore, the data value at the time t=7 is identified from the history elements stored underneath the marker.

For example, in a state such as illustrated in FIG. 19, when the fixed clock value of the entire system is 7 or greater, the most recent history element among the history elements stored underneath the marker is {4, t=4} for the record A. The history element {4, t=4} represents that "4" is set as the data value of the key A at the time t=4. Moreover, no commands relating to the key A are received from time t=4 to time t=7, so the data value of the key A at time t=7 is "4". In addition, as for the record B, the most recent history element among the history elements stored under the marker is {14, t=6}. The history element {14, t=6} represents that "14" was set as the data value of the key B at time t=6. No command relating to the key B are received from time t=6 to time t=7, so the data value of the key B at time t=7 is "14". Furthermore, as for the record C, the most recent history element of the history elements that are stored underneath the marker is {22, t=2}. The history element {22, t=2} represents that "22" was set as the data value of the key C at time t=2. No commands relating to the key C are received from the time t=2 to time t=7, to the data value of the key C at time t=7 is "22". When there is a history element that includes information concerning an operation, as explained above, the data values are calculated using plural history elements that are stored underneath the marker.

Figure 20:
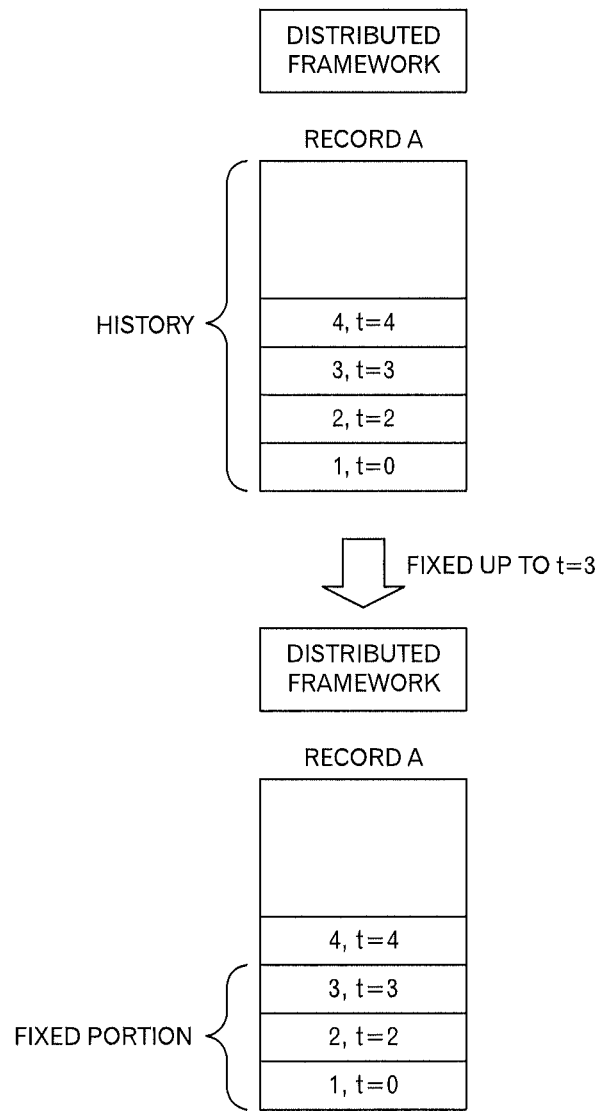
FIG. 20 is a diagram to explain a processing to identify or calculate a data value from the history elements in a fixed portion.

As illustrated in FIG. 20, as for the record A, when the fixed clock value of the entire system become "3" in a state that the history elements {1, t=0}, {2, t=2}, {3, t=3} and {4, t=4} are stored, the three history elements {1, t=0}, {2, t=2} and {3, t=3} correspond to the fixed portion. When the data value at time t=3 is identified (or calculated) from the history elements of this fixed portion, it is found that the data value at time t=3 is "3". In this case, when a history element remains that includes the data value of the key A at time t=3 among the history elements of the fixed portion, there is no problem in deleting the other history elements. Therefore, in this case, the two history elements {1, t=0} and {2, t=2} can be deleted.

Figure 21:
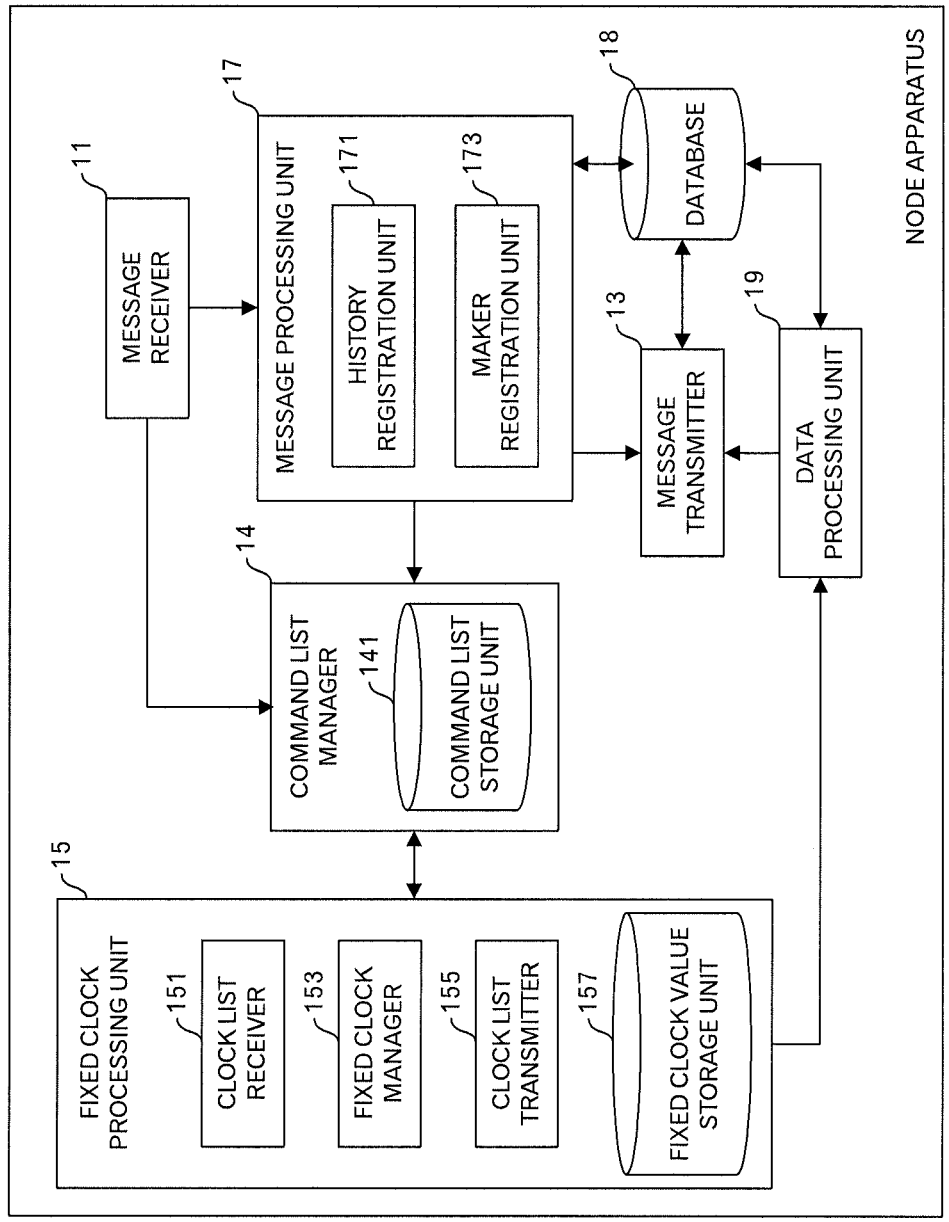
FIG. 21 is a functional block diagram of a node apparatus in the third embodiment.

FIG. 21 is a function block diagram illustrating the functions of a node apparatus of this embodiment. The system configuration of this embodiment is the same as the system configuration illustrated in FIG. 7. The node apparatus relating to this embodiment has a message receiver 11, a message transmitter 13, a command list manager 14, a fixed clock processing unit 15, a message processing unit 17, a database 18 and a data processing unit 19. Incidentally, the command list manager 14 manages a command list storage unit 141 that stores a command list as described above. In addition, the fixed clock processing unit 15 has a clock list receiver 151, a fixed clock manager 153, a clock list transmitter 155 and a fixed clock value storage unit 157. The message receiver 11, the message transmitter 13, command list manager 14 and fixed clock processing unit 15 are basically the same as those explained in the first embodiment.

Moreover, the message processing unit 17 has a history registration unit 171 that registers history elements into the database 18, and a marker registration unit 173 that registers markers into the database 18. In addition, the message processing unit 17 has the same function as the message processing unit 12 that was explained in the first embodiment. When registering markers, the marker registration unit 173 in each of the node apparatuses cooperate with each other to register the same markers into the databases 18 in each of the node apparatuses. By doing so, it becomes possible to reference consistent data values in plural records. The data processing unit 19 carries out a processing by using data that is stored in the fixed clock value storage unit 157 in the fixed clock processing unit 15 and in the database 18, updates the database 18 and instructs the message transmitter 13 to transmit the processing results. In response to an instruction from the data processing unit 19, the message transmitter 13 transmits data stored in the database 18 to the user terminal, and updates the database 18.

Figure 22A:
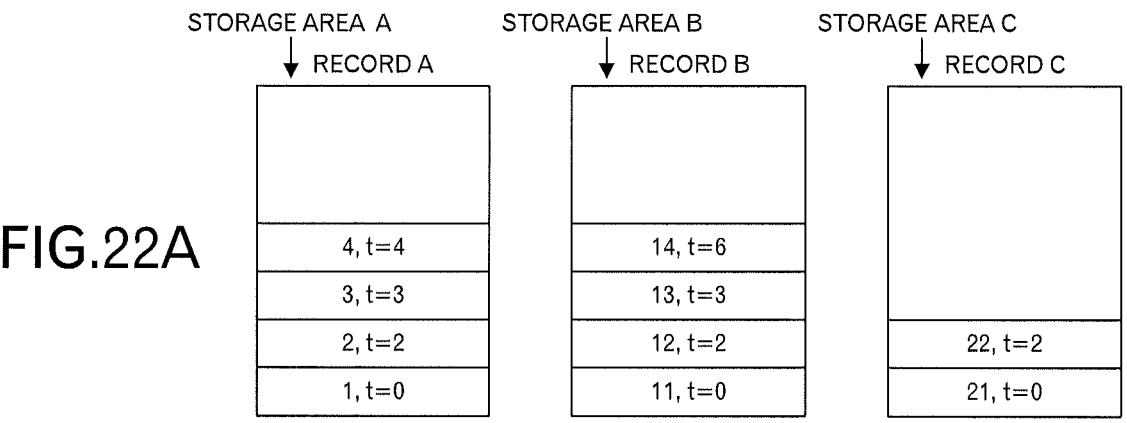
FIGS. 22A to 22D are diagrams to explain a processing of the entire distributed processing system relating to the third embodiment.

Next, the processing of the overall distributed processing system in this embodiment will be explained using FIGS. 22A to 22D and FIGS. 23A to 23D. For example, in this distributed processing system, for each of the records A to C, history elements are stored as illustrated in FIG. 22A. Here, the storage area for storing history elements relating to commands for the record A is called storage area A, the storage area for storing history elements relating to commands for the record B is called storage area B, and the storage area for storing history elements relating to commands for the record C is called storage area C (this is the same hereafter). In addition, in FIG. 22A, one block in a storage area represents one history element (this is the same hereafter). Incidentally, these storage areas are maintained in the database 18 of the node apparatus. In FIG. 22A, the four history elements $\{1, t=0\}$, $\{2, t=2\}$, $\{3, t=3\}$ and $\{4, t=4\}$ are stored in the storage area A in order from the bottom. Moreover, the storage area B stores the four history elements $\{11, t=0\}$, $\{12, t=2\}$, $\{13, t=3\}$ and $\{14, t=6\}$ in order from the bottom. Furthermore, the storage area C stores the two history elements $\{21, t=0\}$ and $\{22, t=2\}$ in order from the bottom.

Figure 22B:
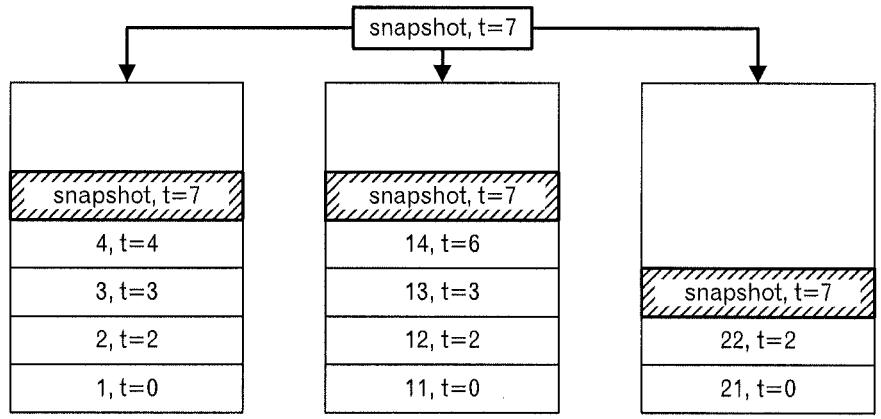

For example, in the state illustrated in FIG. 22A, when a reference request is received to reference plural data values at the time $t=7$, the marker registration unit 173 in each of the node apparatuses cooperates with each other to register a marker $\{snapshot, t=7\}$ into the database 18. The registration position of the marker is identified from the logical clock value included in that marker. When the marker has been registered, the contents of each storage area become as illustrated in FIG. 22B. In FIG. 22B, because the logical clock value included in the marker is greater than the logical clock values in the stored history elements, the marker is located at the very top of each storage area. In FIG. 22B, the shaded blocks in the storage areas represent the marker (this is the same hereafter).

Figure 22C:
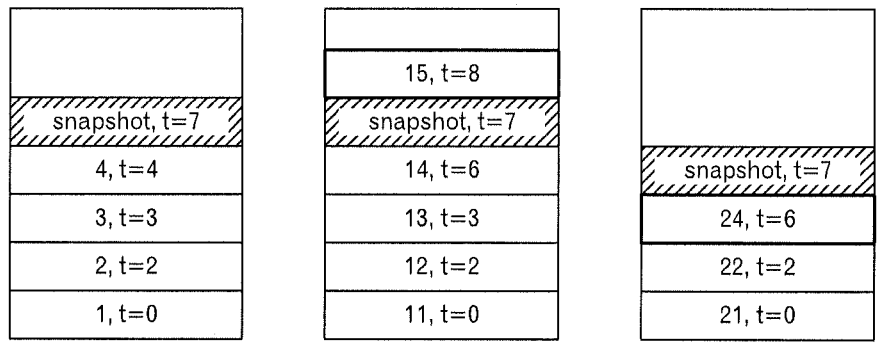

After that, for example, one of the node apparatuses receives a set command "set (key=C, 24)" at time $t=6$, and receives a set command "set (key=B, 15)" at time $t=8$. As a result, the history registration unit 171 registers a history element into the database 18. For example, as illustrated in FIG. 22C, in the storage area C, a history element $\{24, t=6\}$ is inserted underneath the marker. Also, in the storage area B, a history element $\{15, t=8\}$ is stacked on the marker.

Figure 22D:
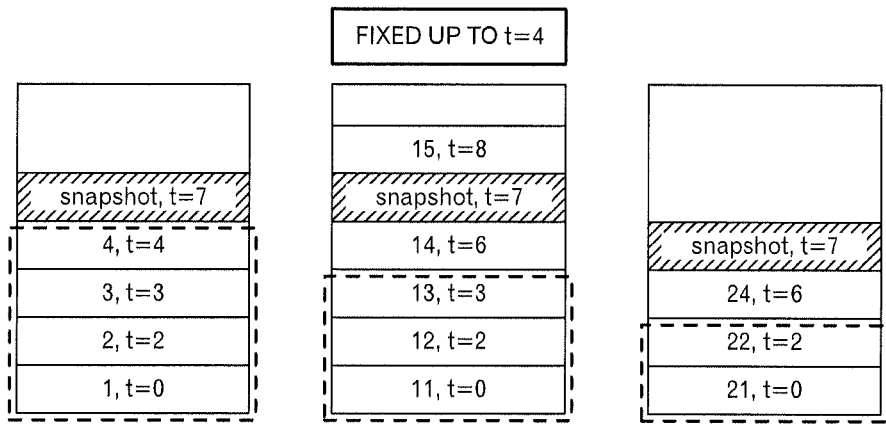
Figure 23A:
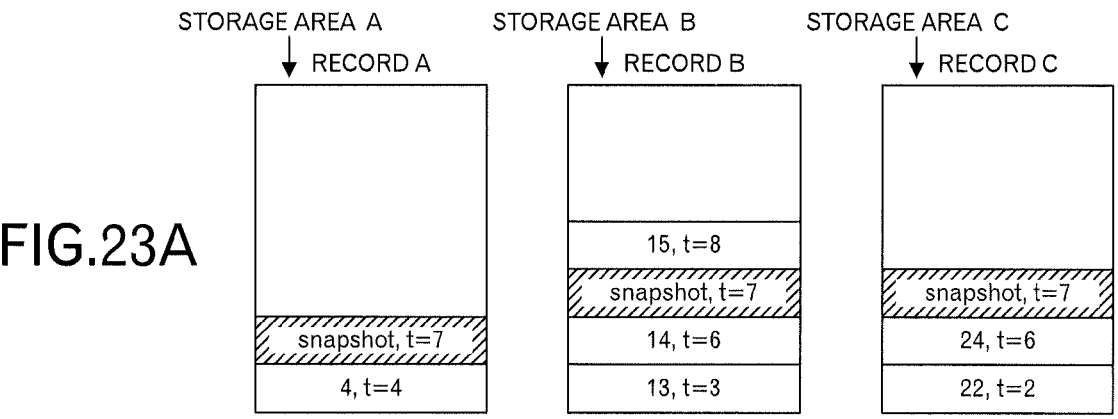
FIGS. 23A to 23D are diagram to explain the processing of the entire distributed processing system relating to the third embodiment.

After that, it is assumed that data up to time $t=4$ are fixed. In other words, it is assumed that "4" is identified as the fixed clock value of the entire system. In this case, the data processing unit 19 identifies (or calculates) the data value at time $t=4$ from the history elements stored in the database 18. For example, as illustrated in FIG. 22D, as for the record A, the four history elements $\{1, t=0\}$, $\{2, t=2\}$, $\{3, t=3\}$ and $\{4, t=4\}$ among the history elements stored in the storage area A correspond to the fixed portion. Then, "4" is identified for the data value of the key A at time $t=4$ from the history elements in this fixed portion. Moreover, as for the record B, the three history elements $\{11, t=0\}$ $\{12, t=2\}$ and $\{13, t=3\}$ among the history elements stored in the storage area B correspond to the fixed portion, and "13" is identified as the data value of the key B at time $t=4$ from the history elements of this fixed portion. Furthermore, as for the record C, the two history elements $\{21, t=0\}$ and $\{22, t=2\}$ among the history elements stored in the storage area C correspond to the fixed portion and "22" is identified as the data value of the key C at time $t=4$ from the history elements of this fixed portion. Incidentally, as long as a history element $\{4, t=4\}$ is maintained in the storage area A, the history elements that are stored under that history element can be deleted. Similarly, as long as a history element $\{13, t=3\}$ is maintained in the storage area B, the history elements that are stored under that history element can be deleted. Furthermore, as long as a history element $\{22, t=2\}$ is maintained in the storage area C, the history element that is stored under that history element can be deleted. Therefore, the data processing unit 19 deletes the three history elements $\{1, t=0\}$, $\{2, t=2\}$ and $\{3, t=3\}$ from the storage area A, deletes the two history elements $\{11, t=0\}$ and $\{12, t=2\}$ from the storage area B, and deletes the history element $\{21, t=0\}$ from the storage area C. After these history elements have been deleted, the contents of each storage area become as illustrated in FIG. 23A.

Figure 23B:
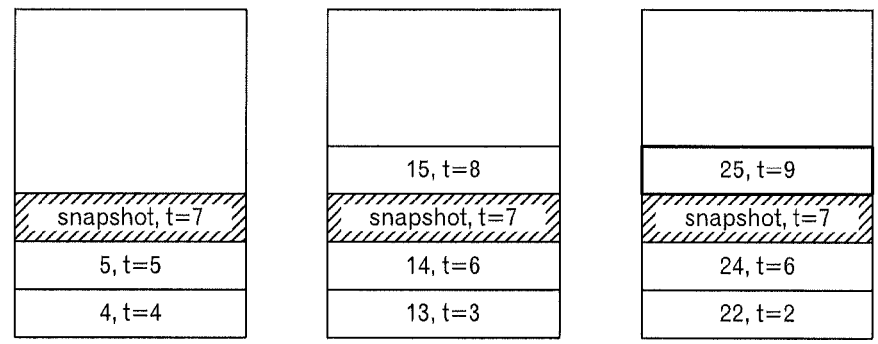

After that, for example, it is assumed that one of the node apparatuses receives a set command "set (key=A, 5)" at time $t=5$, and receives a set commend "set (key=C, 25)" at time $t=9$. As a result, the history registration unit 171 registers history elements into the database 18. For example, as illustrated in FIG. 23B, in the storage area A, the history element $\{5, t=5\}$ is inserted underneath the marker. Moreover, in the storage area C, the history element $\{25, t=9\}$ is stacked on the marker.

Figure 23C:
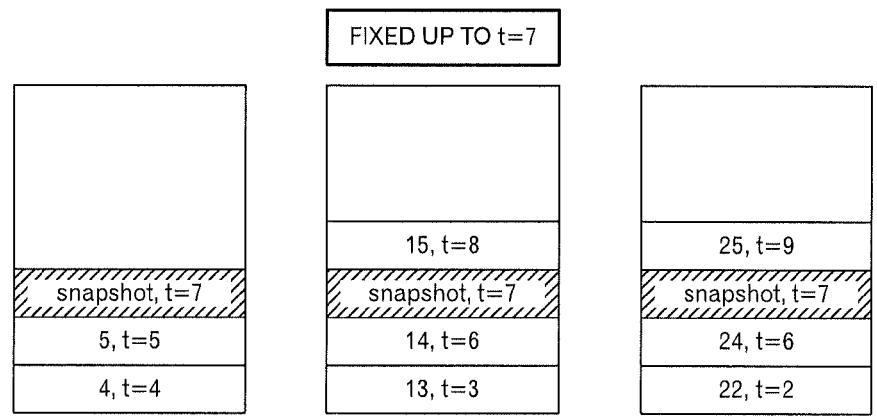
Figure 23D:
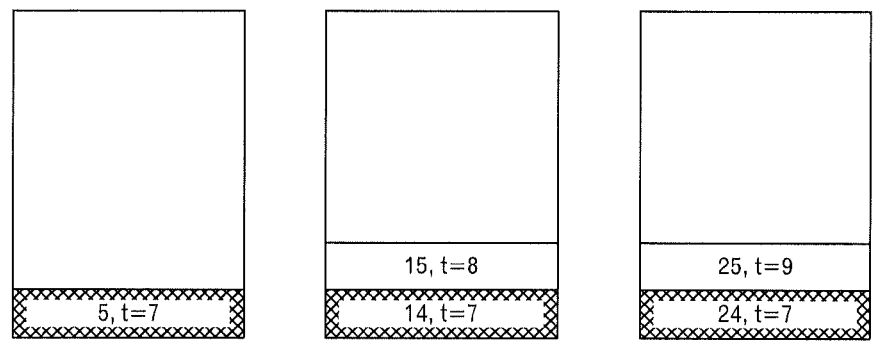

After that, it is assumed that the fixed clock value of the entire system becomes the logical clock value included in the marker or greater. Here, it is assumed that "7" is identified as the fixed clock value of the entire system. In this case, the data processing unit 19 identifies (or calculates) the data value at the time represented by the logical clock value included in the marker from the history elements stored in the database 18 underneath the marker. As illustrated in FIG. 23C, as for the record A, the two history elements $\{4, t=4\}$ and $\{5, t=5\}$ are stored into the storage area A underneath the marker, and from these two history elements, "5" is identified as the data value of the key A at time $t=7$. Moreover, as for the record B, the two history elements {13, t=3} and {14, t=6} are stored in the storage area B underneath the marker, and "14" is identified as the data value of the key B at time t=7 from these two history elements. Furthermore, as for the record C, the two history elements {22, t=2} and {24, t=6} are stored in the storage area C underneath the marker, and "24" is identified as the data value of the key C at time t=7 from these two history elements. The data processing unit 19 then sets the identified (or calculated) value instead of the information (in other words "snapshot") concerning the reference request in the marker. For example, when "5" is identified as the data value at the time t=7, the data processing unit 19 sets this value in the marker {snapshot, t=7}, and the contents of the marker become {5, t=7}. For convenience of the explanation, in the following, a marker before the data value is set (in other words, a marker in which "snapshot" is set) may be called the first marker, and a marker after the data value is set may be called the second marker. The data processing unit 19 then deletes the history elements that are stored underneath the marker, in each storage area. This is because, as long as the history elements that are stored underneath the marker are deleted after the data value at the time represented by the logical clock value included in the marker has been identified, there is no problem. After the history elements that are stored underneath the marker have been deleted, the contents of each storage area become as illustrated in FIG. 23D. Incidentally, in FIG. 23D, the shaded blocks illustrate second markers (this is the same hereafter). In FIG. 23D, only the second marker {5, t=7} is stored in the storage area A. The second marker {14, t=7} and the history element {15, t=8} are stored in the storage area B. Moreover, the second marker {24, t=7} and the history element {25, t=9} are stored in the storage area C. In the state illustrated in FIG. 23D, when a get command "get (key=B)" is received for example, the data value (=15) at that point in time is returned. On the other hand, when a command is received for acquiring the data value included in the second marker, the data value (=14) that is included in the second marker is returned.

Thus, when the fixed clock value of the entire system is equal to or greater than the logical clock value included in the first marker, the data value at the time represented by the logical clock value included in the first marker is identified (or calculated) from the history elements stored underneath the first elements.

Figure 24:
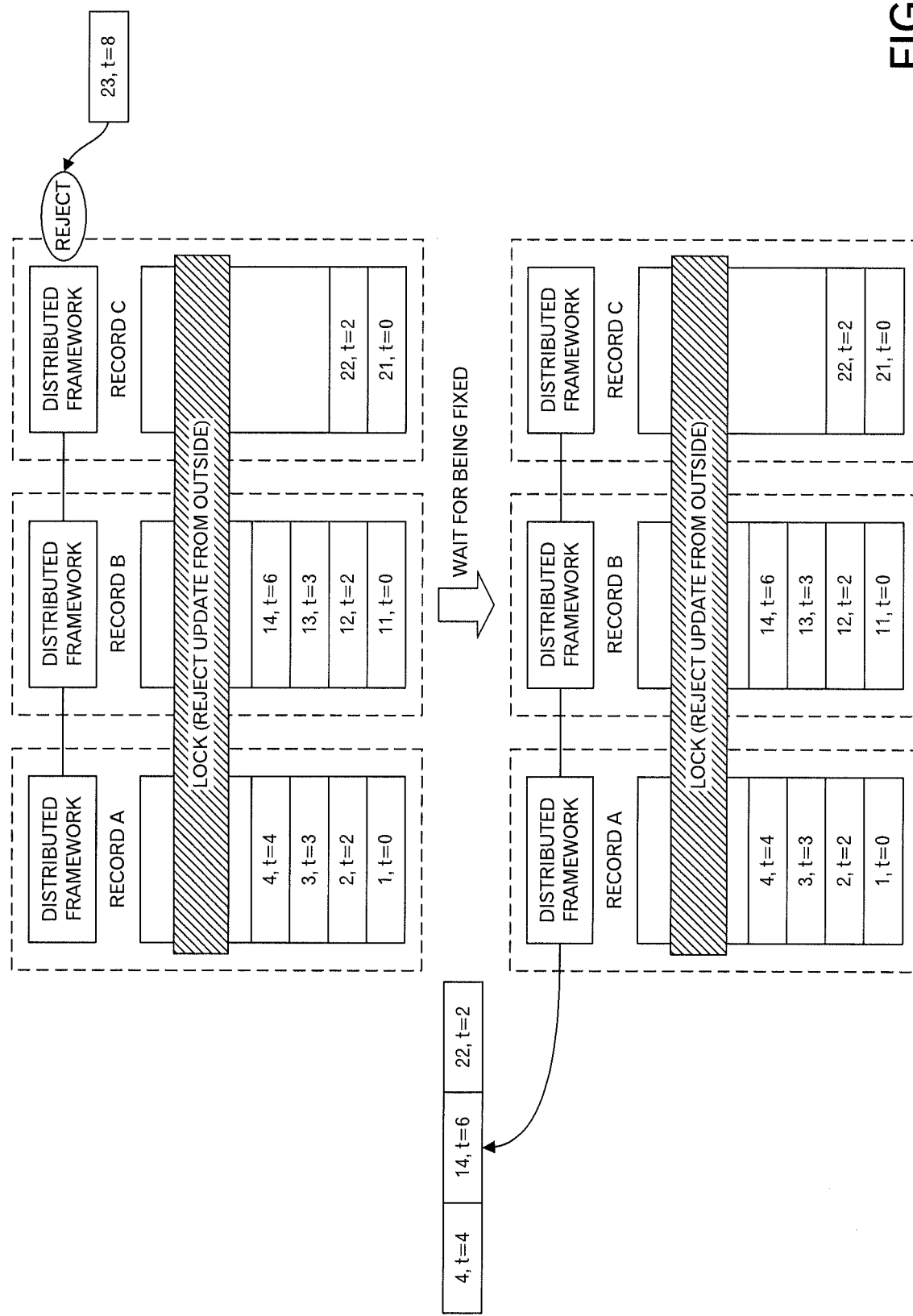
FIG. 24 is a diagram depicting an example of another method to reference plural data values at a certain time point.

As one method of referencing plural data values at a certain point in time, a method is considered as illustrated in FIG. 24, for example. More specifically, when a reference request for referencing plural data values is received, a lock (also called a giant lock) is put on the entire distributed processing system, which rejects update requests from the outside. For example, when a reference request was received at time t=7, as illustrated in FIG. 24, even though a set command "set (key=C, 23)" is received at the time t=8 from the outside, that command is rejected. After that, the processing waits for the data values having been fixed up to the time t=7, and when the values are fixed, the data vales are identified from the history elements that are stored. However, in this method, since a lock has been placed on the entire distributed processing system, the performance of the distributed processing system is greatly affected. However, with the method relating to this embodiment, there is no need for the lock, so it is possible to reference plural data values at a certain point in time without affecting the performance of the distributed processing system.

Figure 25A:
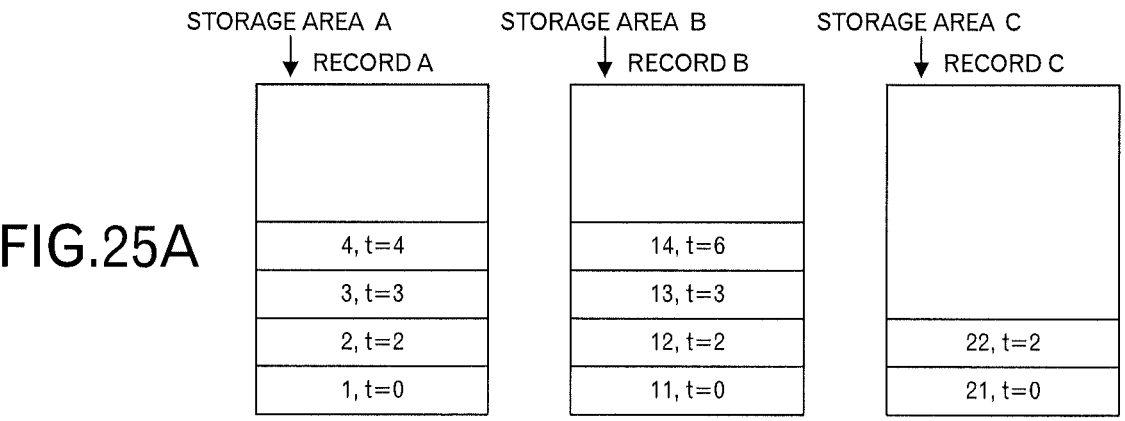
FIGS. 25A to 25D are diagrams to explain a processing when a delete command is received.

Next, a processing for the case in which a delete command is received will be explained using FIGS. 25A to 25D and FIGS. 26A to 26D. For example, in the distributed processing system, history elements are stored as illustrated in FIG. 25A. In FIG. 25A, the four history elements {1, t=0}, {2, t=2}, {3, t=3} and {4, t=4} are stored in the storage area A in order from the bottom. Moreover, the four history elements {11, t=0}, {12, t=2}, {13, t=3} and {14, t=6} are stored in the storage area B in order from the bottom. Furthermore, the two history elements {21, t=0} and {22, t=2} are stored in the storage area C in order from the bottom.

Figure 25B:
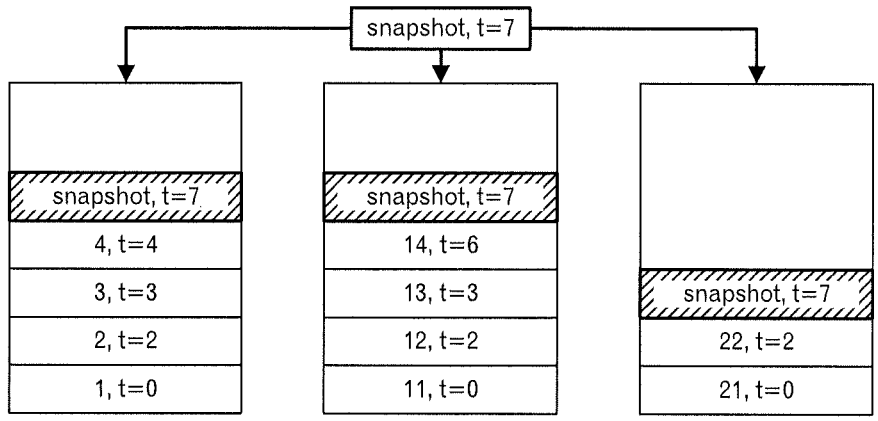

For example, in the state illustrated in FIG. 25A, when a reference request for referencing plural data values at time t=7 is received, the marker registration unit 173 in each of the node apparatuses cooperates with each other to register a first marker {snapshot, t=7} into the databases 18. After this first marker has been registered, the contents of each storage area become as illustrated in FIG. 25B. In FIG. 25B, because the logical clock value that is included in the first marker is greater than the logical clock values of the stored history elements, the first markers are stacked at the very top of each storage area.

Figure 25C:
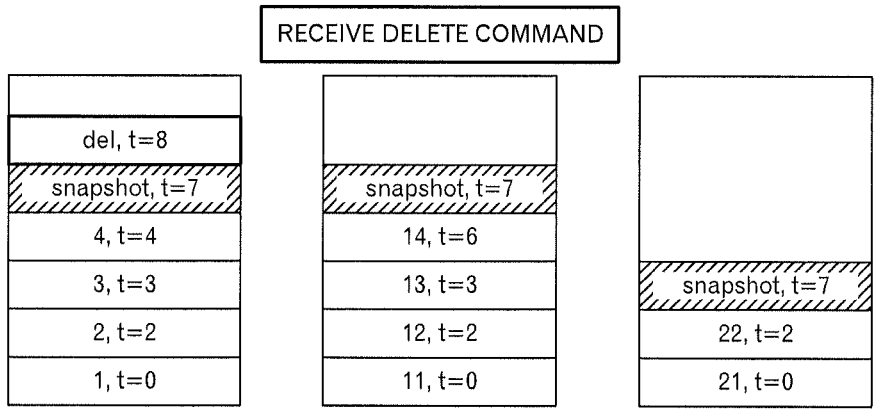

After that, it is assumed that any one node apparatus receives a delete command "delete (key=A)" at time t=8. As a result, the history registration unit 171 determines whether or not a first marker is registered in the storage area A, and when a first marker is registered, the history registration unit 171 registers the history element {del, t=8} relating to the delete command in the storage area A without deleting any of the history elements in the storage area A. For example, as illustrated in FIG. 25C, the history element {del, t=8} is stacked on the first marker.

Figure 25D:
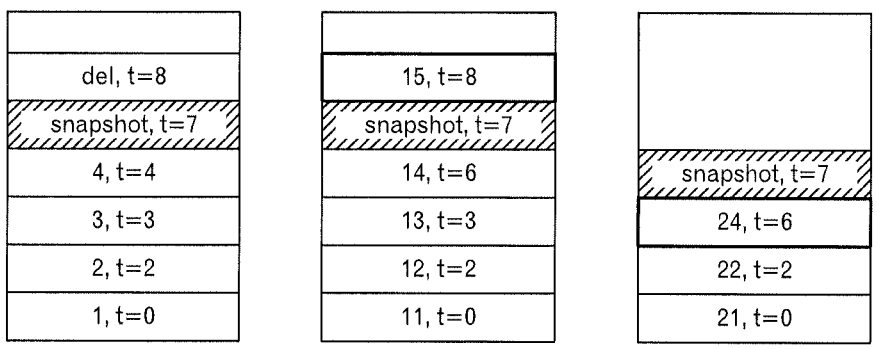

Moreover, it is assumed that a node apparatus that is different from the node apparatus that received the delete command receives a set command "set (key=C, 24)" at time t=6, and receives a set command "set (key=B, 15)" at time t=8. As a result, the history registration unit 171 registers history elements into the database 18. For example, as illustrated in FIG. 25D, in the storage area C, the history element {24, t=6} is inserted underneath the first marker. Also, in the storage area B, the history element {15, t=8} is stacked on the first marker.

Figure 26A:
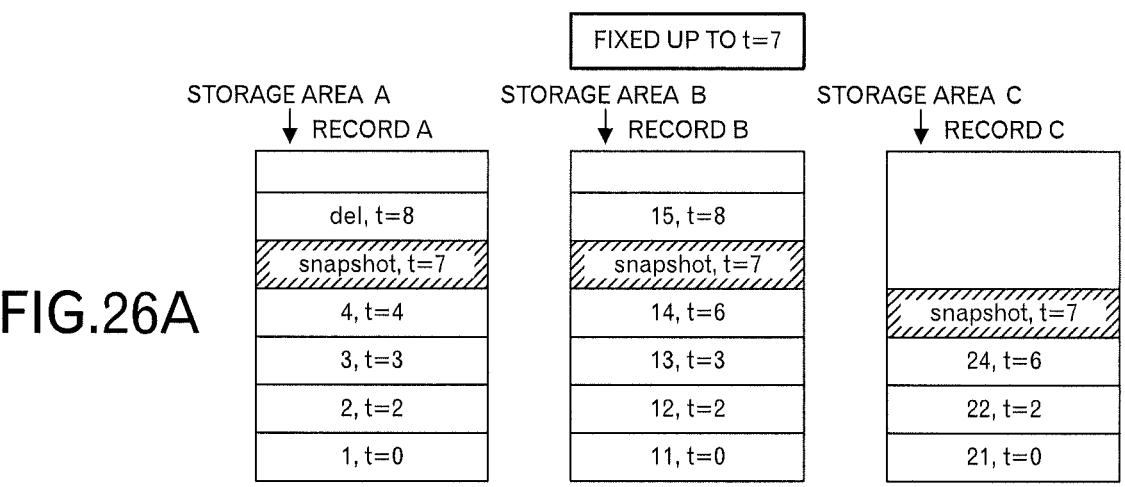
FIGS. 26A to 26D are diagrams to explain a processing when the delete command is received.

After that, it is assumed that the fixed clock value of the entire system becomes equal to or greater than the logical clock value that is included in the first marker. Here, "7" is identified as the fixed clock value of the entire system. In this case, the data processing unit 19 identifies (or calculates) the data values at the time represented by the logical clock value that is included in the first marker from the history elements stored in the database 18 underneath the first marker. As illustrated in FIG. 26A, as for the record A, the four history elements {1, t=0}, {2, t=2}, {3, t=3} and {4, t=4} are stored in the storage area A underneath the first marker, and "4" is identified as the data value of the key A at time t=7 from these four history elements. Moreover, as for the record B, the four history elements {11, t=0}, {12, t=2}, {13, t=3} and {14, t=6} are stored in the storage area B underneath the first marker, and "14" is identified as the data value of the key B at time t=7 from these four history elements. Furthermore, as for the record C, the three history elements {21, t=0} {22, t=2} and {24, t=6} are stored in the storage area C underneath the first marker, and "24" is identified as the data value of the key C at time t=7 from these three history elements.

Figure 26B:
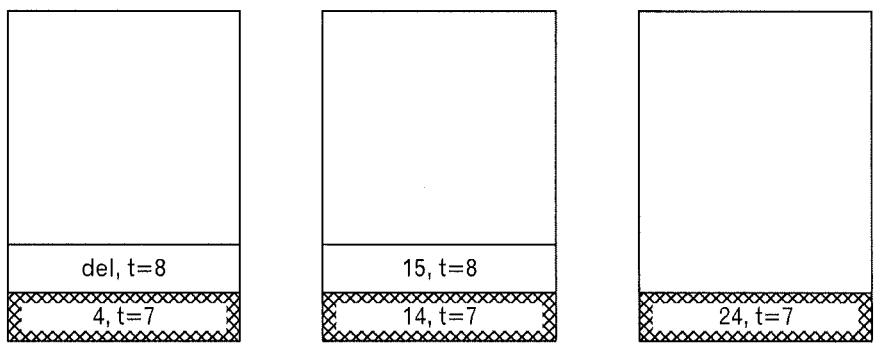

Then, the data processing unit 19 sets the identified (or calculated) values instead of the information concerning the reference request (in other words "snapshot") in the first marker, and stores the marker as a second marker. The data processing unit 19 deletes the history elements that are stored in the storage areas underneath the second marker. This is because, as long as the history elements stored under the second marker are deleted after the data values at the time represented by the logical clock value included in the first marker have been identified, there is no problem. After the history elements that are stored under the second marker have been deleted, the contents of each storage area become as illustrated in FIG. 26B. In FIG. 26B, the second marker {4, t=7} and the history element {del, t=8} relating to the delete command are stored in the storage area A. Moreover, the second marker {14, t=7} and the history element {15, t=8} are stored in the storage area B. Furthermore, the second marker {24, t=7} is stored in the storage area C.

Figure 26C:
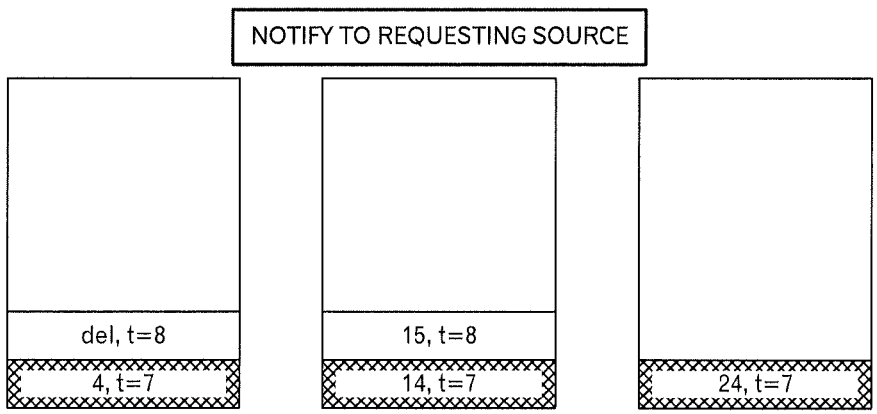
Figure 26D:
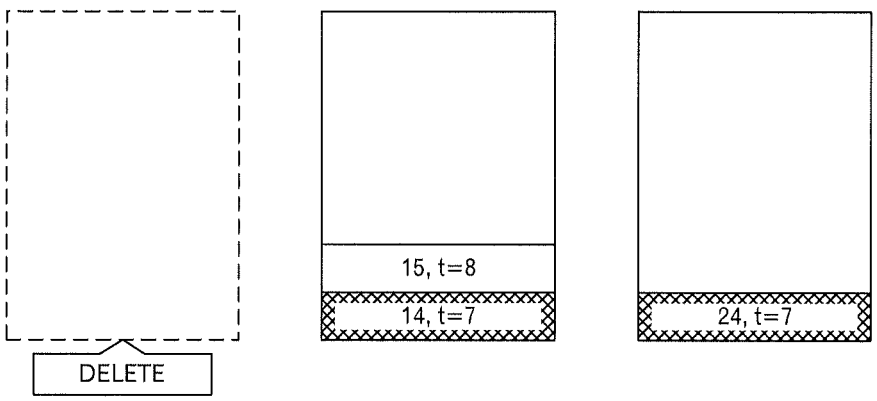

After that, at arbitrary timing, the message transmitter 13 notifies the requesting source of the reference request of the data values set in the second marker. For example, as illustrated in FIG. 26C, the requesting source of the reference request is notified that "4", "14" and "24" are the data values for the keys A to C at time t=7. Then, there are history elements relating to the delete command stored in the storage area A, so after the requesting source of the reference request has been notified of the data values set in the second marker, the data relating to the record A are deleted. More specifically, the data in the storage area A are deleted. For example, after the data in the storage area A have been deleted, the contents of each storage area become as illustrated in FIG. 26D. In FIG. 26D, the contents of the storage areas B and C are the same as in FIG. 26C, however, the storage area A is now empty.

In this way, even though a delete command is received, when a first marker is registered, the history elements that are stored in the storage areas are not deleted. This makes it possible to identify (or calculate) data values at the time represented by the logical clock value included in the first marker.

Figure 27A:
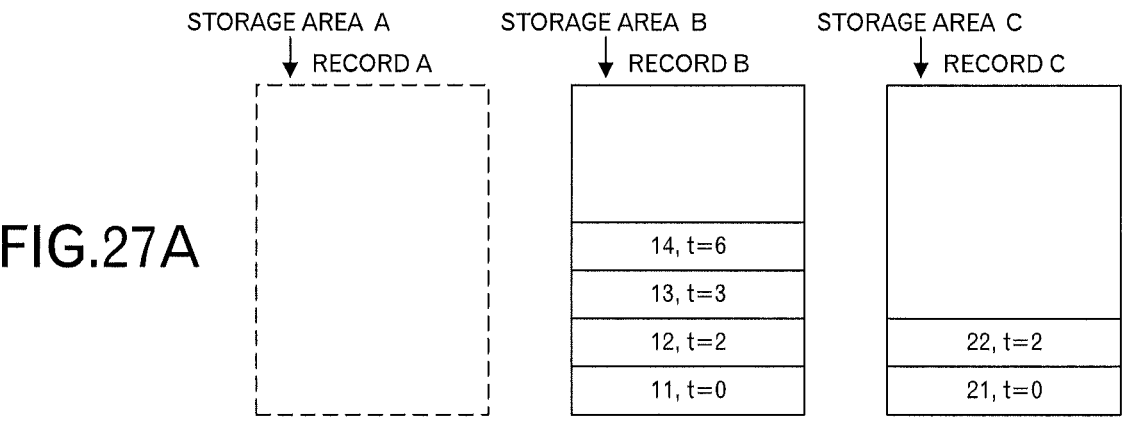
FIGS. 27A to 27D are diagrams to explain a processing when the reference request is received after record A was deleted.

Next, a processing in the case where a reference request is received after a certain record has been deleted will be explained using FIGS. 27A to 27D and FIGS. 28A and 28B. For example, in a distributed processing system, it is assumed that history elements are stored as illustrated in FIG. 27A. Here, it is assumed that data relating to the record A has been deleted by a delete command, and the contents of each storage area become as illustrated in FIG. 27A. In FIG. 27A, the storage area A is empty. Moreover, the four history elements {11, t=0}, {12, t=2}, {13, t=3} and {14, t=6} are stored in the storage area B in order from the bottom. Furthermore, the two history elements {21, t=0} and {22, t=2} are stored in the storage area C in order from the bottom.

Figure 27B:
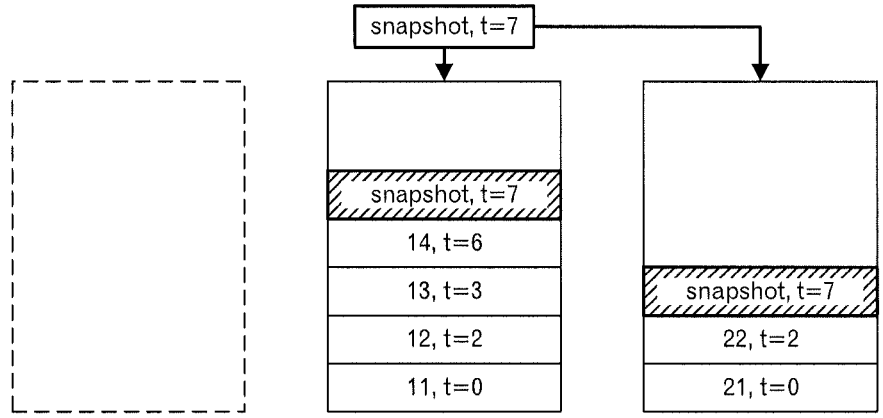

For example, in the state illustrated in FIG. 27A, when a reference request for referencing plural data values at time t=7 is received, the marker registration unit 173 in each of the node apparatuses cooperates with each other to register a first marker {snapshot, t=7} in the database 18. Here, because this is carried out after the data relating to the record A were deleted, there is no first marker in the storage area A. However, as will be explained later, when data relating to the record A are set again, a first marker will be registered. Therefore, the first marker is stored into a predetermined area inside the database 18, and that first marker is saved. After the first marker has been registered in the storage areas B and C, the contents become as illustrated in FIG. 27B. In FIG. 27B, since the logical clock value included in the first marker is greater than the logical clock values in the stored history elements, the first marker is stacked on the very top of the storage areas B and C.

Figure 27C:
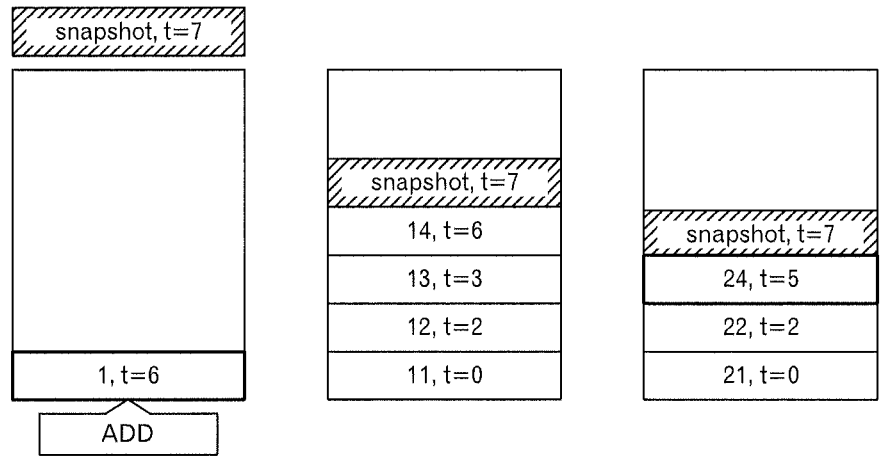
Figure 27D:
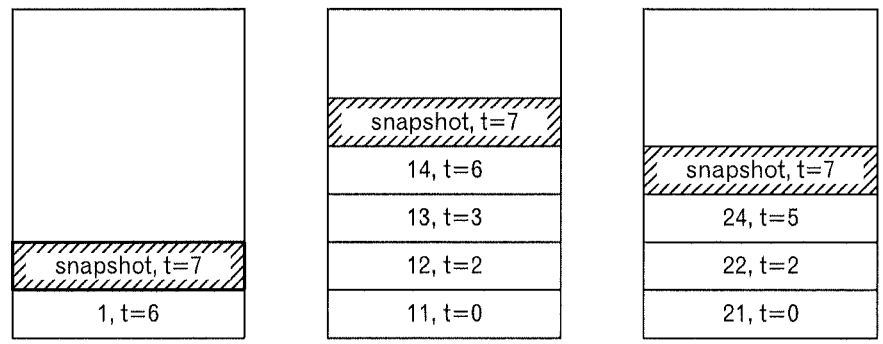

After that, one of the node apparatuses receives a set command "set (key=C, 24)" at time t=5, and receives a set command "set (key=A, 1)" at the time t=6. As a result, the history registration unit 171 registers history elements in the database 18. For example, as illustrated in FIG. 27C, the history element {24, t=5} is inserted into the storage area C underneath the marker. Moreover, in FIG. 27B, the storage area A was empty, however, as illustrated in FIG. 27C, the history element {1, t=6} is added to the storage area A. The history registration unit 171 then determines whether or not the history element, which was registered this time, is the first history element, and when it is the first history element, it is determined whether or not there is a first marker to be registered. When there is a saved first marker, for example, it is determined that there is a first marker to be registered. When it is determined that there is a first marker to be registered, the first marker is added to the storage area where the history element is registered this time. Here, because the history element {1, t=6} that was added to the storage area A is the first history element, and there is a first marker {snapshot, t=7} to be registered, the first marker is placed above the history element {1, t=6} in the storage area A, for example, as illustrated in FIG. 27D.

Figure 28A:
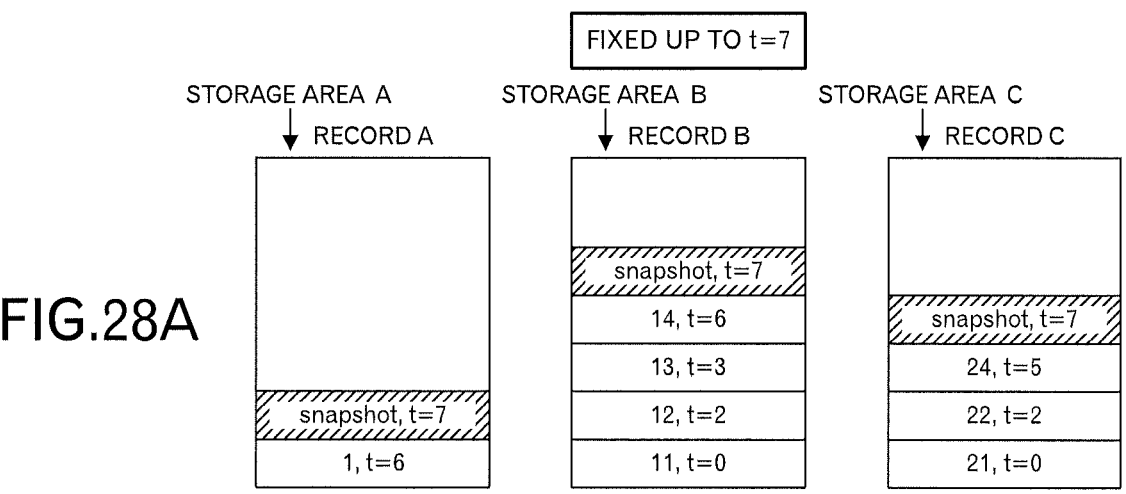
FIGS. 28A and 28B are diagrams to explain the processing when the reference request is received after record A was deleted.

After that, it is assumed that the fixed clock value of the entire system becomes equal to or greater than the logical clock value that is included in the first marker. Here, it is assumed that "7" is identified as the fixed clock value of the entire system. In this case, the data processing unit 19 identifies (or calculates) the data values at the time represented by the fixed clock value that is included in the first marker from the history elements that are stored in the database 18 underneath the first marker. As illustrated in FIG. 28A, as for the record A, only the history element {1, t=6} is stored in the storage area A underneath the first marker, and "1" is identified as the data value of the key A at time t=7. Moreover, as for the record B, the four history elements {11, t=0}, {12, t=2}, {13, t=3} and {14, t=6} are stored in the storage area B underneath the first marker, and from these four history elements, "14" is identified as the data value of the key B at time t=7. Furthermore, as for the record C, the three history elements {21, t=0}, {22, t=2} and {24, t=5} are stored in the storage area C underneath the first marker, and from these three history elements, "24" is identified as the data value of the key C at time t=7.

Figure 28B:
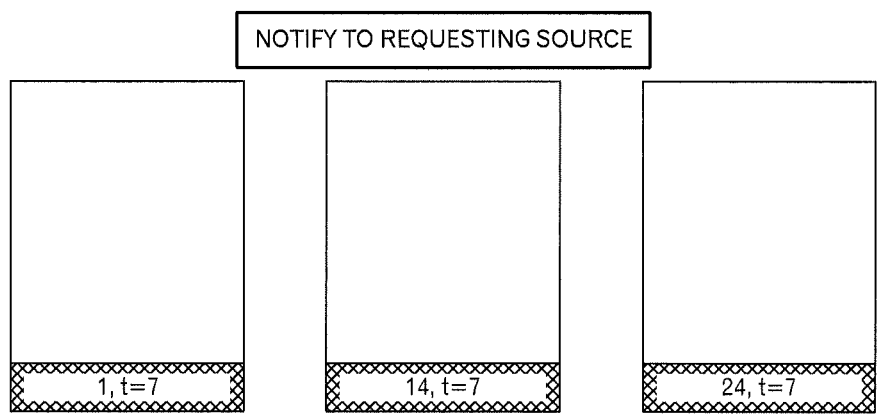

The data processing unit 19 then sets the identified (or calculated) value instead of the information concerning the reference request (in other words "snapshot") in the first marker, and stores the changed first marker as the second marker. The data processing unit 19 also deletes the history elements stored in each storage area, underneath the second marker. After the history elements stored underneath the second marker have been deleted, the contents of each storage area become as illustrated in FIG. 28B. In FIG. 28B, the second marker {1, t=7} is stored in the storage area A. Moreover, the second marker {14, t=7} is stored in the storage area B. Furthermore, the second marker {24, t=7} is stored in the storage area C. At arbitrary timing, the requesting source of the reference request is notified of the data values that are set in the second marker.

Figure 29:
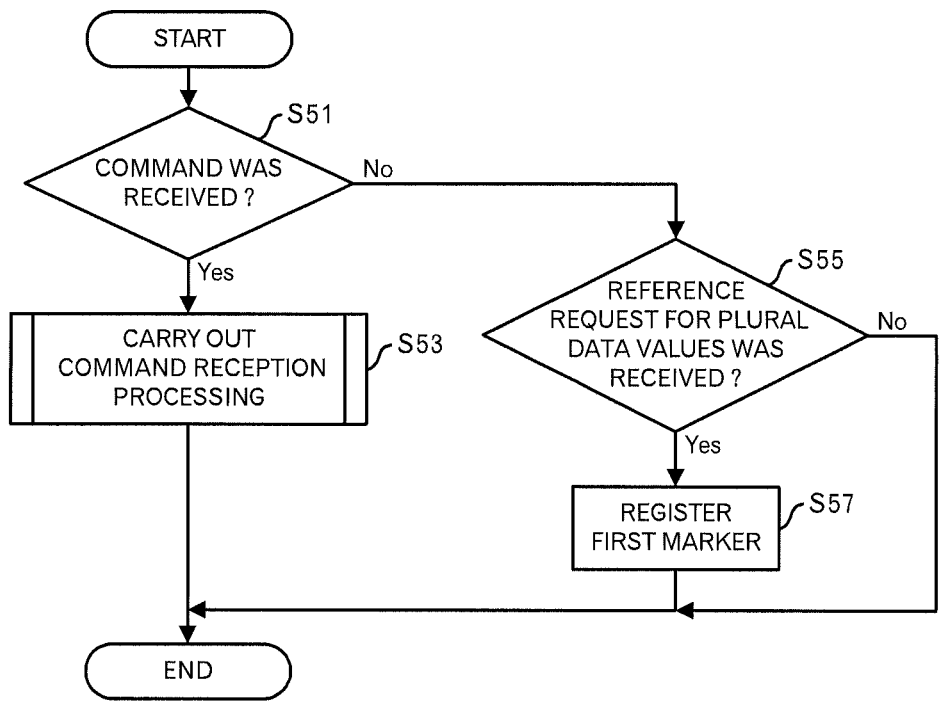
FIG. 29 is a diagram depicting a processing flow of the node apparatus when a command or reference request is received from a user terminal.

Next, the processing flow in a node apparatus of this third embodiment will be explained. First, the processing flow when a command or reference request is received from a user terminal is explained using FIG. 29. First, the message receiver 11 receives a command or reference request from a user terminal. The message receiver 11 then determines whether or not a command was received (FIG. 29: step S51). When a command was received (step S51: YES route), the message receiver 11 outputs the received command to the message processing unit 17. The message processing unit 17 then carries out a command reception processing for the received command (step S53). After that, the processing ends. The command reception processing is explained using FIG. 30.

Figure 30:
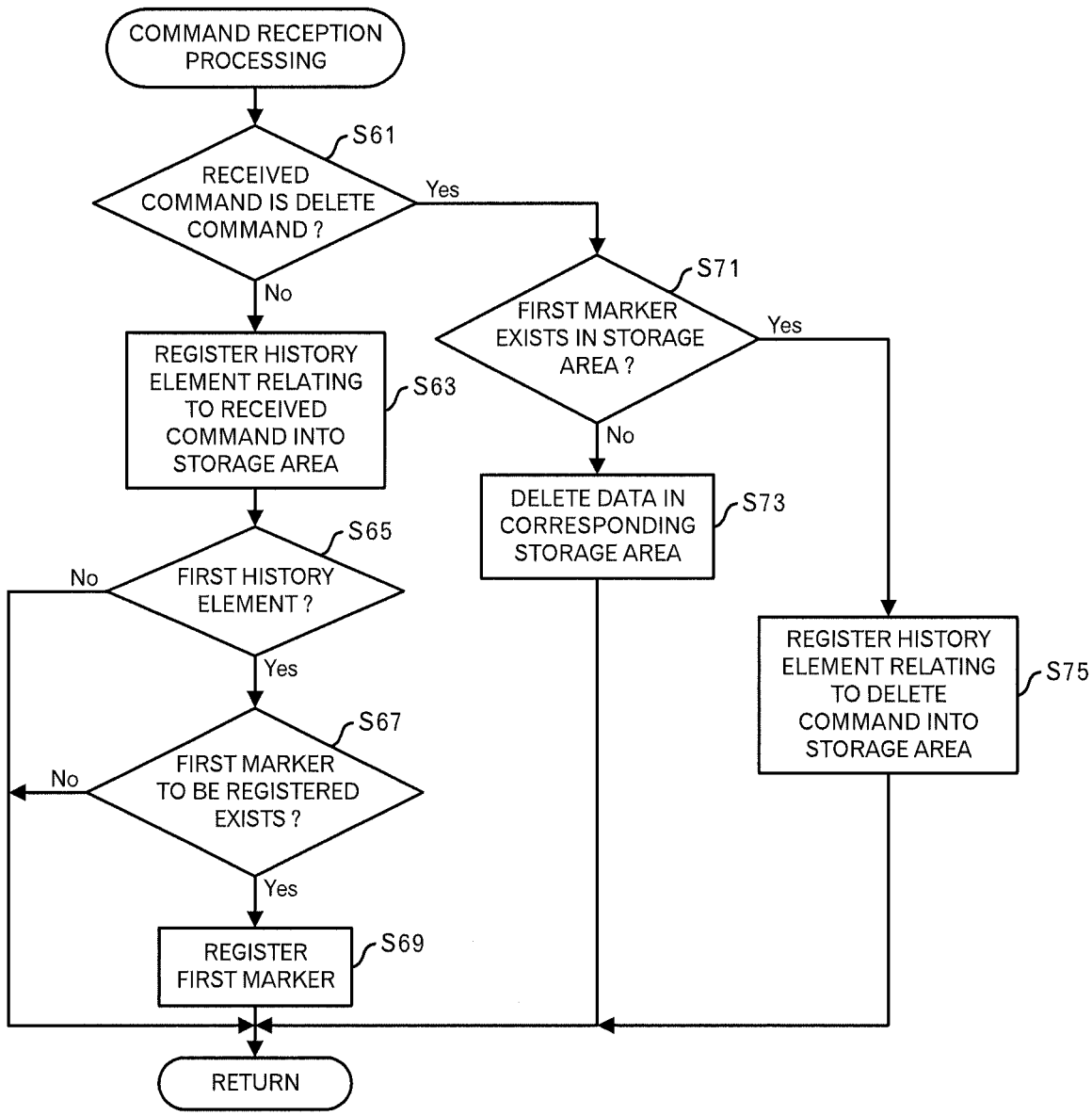
FIG. 30 is a diagram depicting a processing flow when receiving a command reception processing.

First, the message processing unit 17 determines whether or not the received command is a delete command (FIG. 30: step S61). When the received command is not a delete command (step S61: NO route), the history registration unit 171 of the message processing unit 17 registers a history element relating to the received command in the appropriate storage area inside the database 18 according to the time stamp (step S63). As described above, the storage area for each record is secured inside the database 18, and the history registration unit 171 registers the history element relating to the received command into the appropriate storage area. When doing this, the history elements inside the storage area are registered such that they are stacked in order of the time stamp. As was explained above, a time stamp that is assigned by the distributed framework when the command was received, and the data value or information concerning the command (for example, information concerning the operation designated by the command) at the time represented by the time stamp are included in the history element. For example, when the received command is a set command, the data value designated by the set command is set in the history element, and when the received command is an inc command, information representing the type of operation (or in other words, increment) is set in the history element.

After that, the history registration unit 171 determines whether or not the history element registered at the step S63 was the first history element in the storage area (step S65). When the history element is not the first history element (step S65: NO route), the processing ends and returns to the calling-source processing.

On the other hand, when the history element is the first history element (step S65: YES route), the marker registration unit 173 determines whether or not there is a first marker to be registered (step S67). As was explained above, when a reference request is received after data relating to the record have been deleted, the first marker is saved in a predetermined area in the database 18. Therefore, the marker registration unit 173 determines whether or not there is a first marker saved in the predetermined area inside the database 18, and when a first marker is saved, it is determined that there is a first marker to be registered. When there is no first marker to register (step S67: NO route), the processing ends and returns to the calling-source processing.

However, when there is a first marker to be registered (step S67: YES route), the marker registration unit 173 registers the first marker into the storage area where the history element was registered at the step S63 (step S69). After that, the processing ends and returns to the calling-source processing.

Moreover, when it is determined at the step S61 that the received command is a delete command (step S61: YES route), the history registration unit 171 searches the database 18 and determines whether or not there is a first marker registered in the storage area corresponding to the record designated in the delete command (step S71). When a first marker is not registered in the corresponding storage area (step S71: NO route), the history registration unit 171 deletes the data (in other words, history elements) in the corresponding storage area (step S73). After that, the processing ends, and returns to the calling-source processing.

On the other hand, when a first marker is registered in the corresponding storage area (step S71: YES route), the history registration unit 171 registers a history element relating to the delete command into the corresponding storage area (step S75). After that, the processing ends, and returns to the calling-source processing.

Returning to the explanation of FIG. 29, when it is determined at the step S51 that a command is not received (step S51: NO route), the message receiver 11 determines whether or not a reference request for referencing plural data values was received (step S55). When a reference request is not received (step S55: NO route), step S57 explained below is skipped and the processing ends. On the other hand, when a reference request was received (step S55: YES route), the message receiver 11 outputs the received reference request to the message processing unit 17. The marker registration unit 173 of the message processing unit 17 then receives the reference request that was received by the message receiver 11, and registers a first marker into each storage area in the database 18 (step S57). Information concerning the reference request (in other words, "snapshot"), and the logical clock value at the time the reference request was received, or the logical clock value that is designated by the reference request are included in the first marker. In addition, information concerning the requesting source of the reference request (for example, the IP address of the requesting source) may be included in the first marker. The maker registration unit 173 cooperates with the marker registration units 173 of the other node apparatuses, registers first markers, which include the same logical clock value, into each of the storage areas in the database 18 of each node apparatus. After that, the processing ends.

By carrying out the processing described above, it is possible to register a history element and a first marker, which relate to a command, into the storage areas in the database 18. Moreover, when a first marker is registered, data inside the corresponding storage area is not deleted even though a delete command is received. Therefore, it is possible to identify (or calculate) data values at the time represented by the logical clock value included in the first marker.

Figure 31:
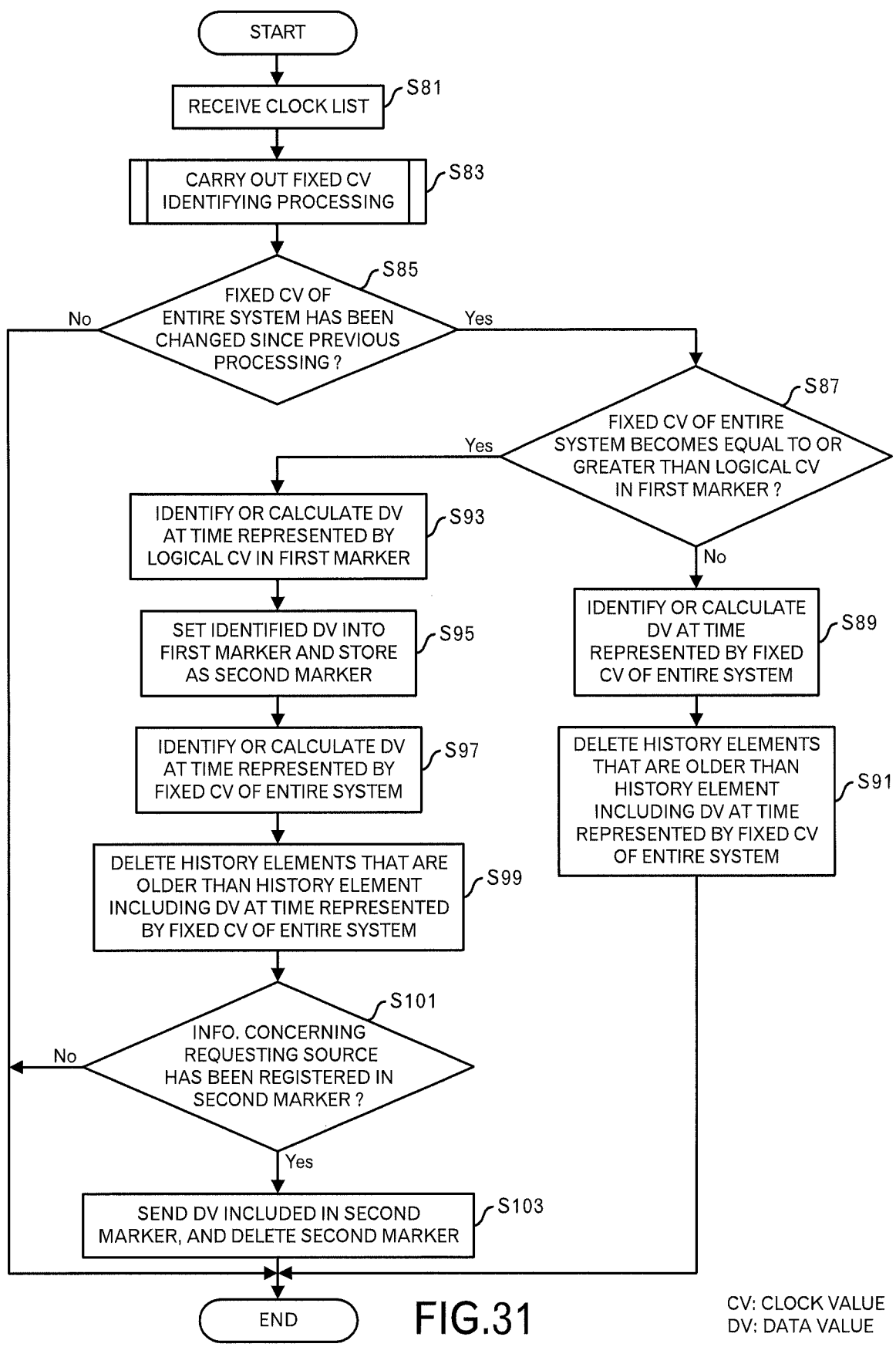
FIG. 31 is a diagram depicting a processing flow when the node apparatus executes a clock list reception processing.

Next, the processing flow when receiving a clock list is explained using FIG. 31. First, the clock list receiver 151 of the fixed clock processing unit 15 receives a clock list from another node apparatus (FIG. 31: steps S81), and outputs the received clock list to the fixed clock manager 153. The fixed clock manager 153 receives the clock list from the clock list receiver 151, and carries out a processing for identifying the fixed clock value (step S83). By carrying out the processing for identifying the fixed clock value, the fixed clock value of the entire system is identified and stored into the fixed clock value storage unit 157. The processing for identifying the fixed clock value is the same as the processing explained in the first embodiment, so a detailed explanation is omitted here.

After that, the data processing unit 19 uses data stored in the fixed clock value storage unit 157 to determine whether or not the fixed clock value of the entire system has changed since the previous processing (step S85). For example, the fixed clock value of the entire system is saved when carrying out this step, and when carrying out this step the next time, the saved fixed clock value of the entire system is used as the fixed clock value of the entire system in the previous processing. In other words, by comparing the fixed clock value of the entire system when carrying out this step with the fixed clock value of the entire system in the previous processing, the data processing unit 19 determines whether or not there was a change in the fixed clock value of the entire system. When there is no change in the fixed clock value of the entire system since the previous processing (step S85: NO route), the processing explained below is skipped, and the processing ends.

On the other hand, when the fixed clock value of the entire system has changed since the previous processing (step S85: Yes route), the data processing unit 19 uses data stored in the fixed clock value storage unit 157 and the database 18 to determine whether or not the fixed clock value of the entire system is equal to or greater than the logical clock value that is included in the first marker (step S87). When the fixed clock value of the entire system is less than the logical clock value included in the first marker (step S87: No route), the processing moves to a processing of step S89. The data processing unit 19 then uses data stored in the database 18 to identify or calculate the data values at the time represented by the fixed clock value of the entire system (step S89). More specifically, as explained in FIG. 22D, the data processing unit 19 identifies or calculates the data values at the time represented by the fixed clock value of the entire system from the history elements in the fixed portion that is stored in the storage area in the database 18. The data processing unit 19 further deletes history elements that are older than the history element that includes the data value at the time represented by the fixed clock value of the entire system from the storage area in the database 18 (step S91) More specifically, as explained in FIG. 23A, the data processing unit 19 deletes history elements that are stored underneath the history element that includes the data value at the time represented by the fixed clock value of the entire system from the storage area. After that, the processing ends.

On the other hand, when it is determined at the step S87 that the fixed clock value of the entire system is equal to or greater than the logical clock value included in the first marker (step S87: Yes route), the processing moves to a processing of step S93. The data processing unit 19 then uses data stored in the database 18 to identify or calculate the data value at the time represented by the logical clock value that is included in the first marker (step S93). More specifically, as explained in FIG. 23C, the data processing unit 19 identifies or calculates the data value at the time represented by the logical clock value included in the first marker from the history elements that are stored in the storage area in the database 18 underneath the first marker. The data processing unit 19 then sets the identified or calculated data value into the first marker, and stores the result as a second marker (step S95). More specifically, as explained above, the data processing unit 19 sets the identified or calculated data value instead of the information concerning the reference request (in other words, "snapshot") into the first marker. The data processing unit 19 uses data stored in the database 18 to identify or calculate the data value at the time represented by the fixed clock value of the entire system (step S97). For example, when the logical clock value included in the first marker is "7", and the fixed clock value of the entire system becomes "10", it is necessary in this embodiment to identify or calculate the data value at the time represented by the logical clock value (=7) included in the first marker, and the data value at the time represented by the fixed clock value (=10). At the step S93 explained above, the data processing unit 19 identifies or calculates the data value represented by the logical clock value included in the first marker, and at the step S97, the data processing unit 19 identifies or calculates the data value represented by the fixed clock value of the entire system. The processing of the step S97 is the same as the processing of the step S89 explained above, so a further explanation will not be given here. When the logical clock value that is included in the first marker and the fixed clock value of the entire system are the same, the data value at the time represented by the fixed clock value of the entire system is the same as the data value at the time represented by the logical clock value included in the first marker, so the processing of the step S97 can be omitted.

After that, the data processing unit 19 deletes history elements that are older than the history element that includes the data value at the time represented by the fixed clock value of the entire system from the storage area in the database 18 (step S99). Here, the second marker is not deleted from the storage area in the database 18.

The data processing unit 19 then determines whether or not information concerning the requesting source of the reference request is included in the second marker that is stored in the storage area of the database 18 (step S101). When there is no information concerning the requesting source of the reference request in the second marker (step S101: NO route), step S103 explained below is skipped, and the processing ends. In this case, the second marker is saved at least until the data values are transmitted to the requesting source of the reference request.

On the other hand, when the information concerning the requesting source of the reference request is included in the second marker (step S101: Yes route), the data processing unit 19 instructs the message transmitter 13 to transmit the data value included in that second marker. In response to the instruction from the data processing unit 19, the message transmitter 13 identifies, in the storage areas in the database 18, the second marker that includes information concerning the requesting source of the reference request, transmits the data values included in the identified second marker to the requesting source of the reference request, and deletes the identified second markers from the storage areas inside the database 18 (step S103) Incidentally, the second markers may not be deleted at the step S103, and may be deleted at some arbitrary timing. As long as the second marker is deleted after the data value included in the second marker is transmitted to the requesting source of the reference request, there is no problem in the timing of deleting. The data processing unit 19 then determines whether or not a history element relating to the delete command is stored in a storage area in the database 18, and whether or not a first or second marker is stored. When a history element relating to the delete command is stored and no first or second marker is stored, the data processing unit 19 deletes data in the storage area corresponding to the record designated by the delete command. After that, the processing ends.

By carrying out the processing described above, it becomes possible to identify (or calculate), at the point in time when the fixed clock of the entire system becomes equal to or greater than the logical clock value included in the first marker, the data value at the time represented by the logical clock value included in the first marker. Incidentally, a first marker that includes the same logical clock value is registered in the storage areas in the database 18 in each of the node apparatuses, so each node apparatus carries out the processing described above. For example, by collecting the data values that are identified (or calculated) by each of the node apparatuses, it is possible to know plural data values at a certain point in time.

Embodiment 4

Next, a fourth embodiment will be explained. In the third embodiment described above, a first marker was also stored in the storage area for storing history elements, however in this fourth embodiment, a configuration is employed in which the first marker is saved in an area that is separate from the storage area for storing history elements.

Figure 32:
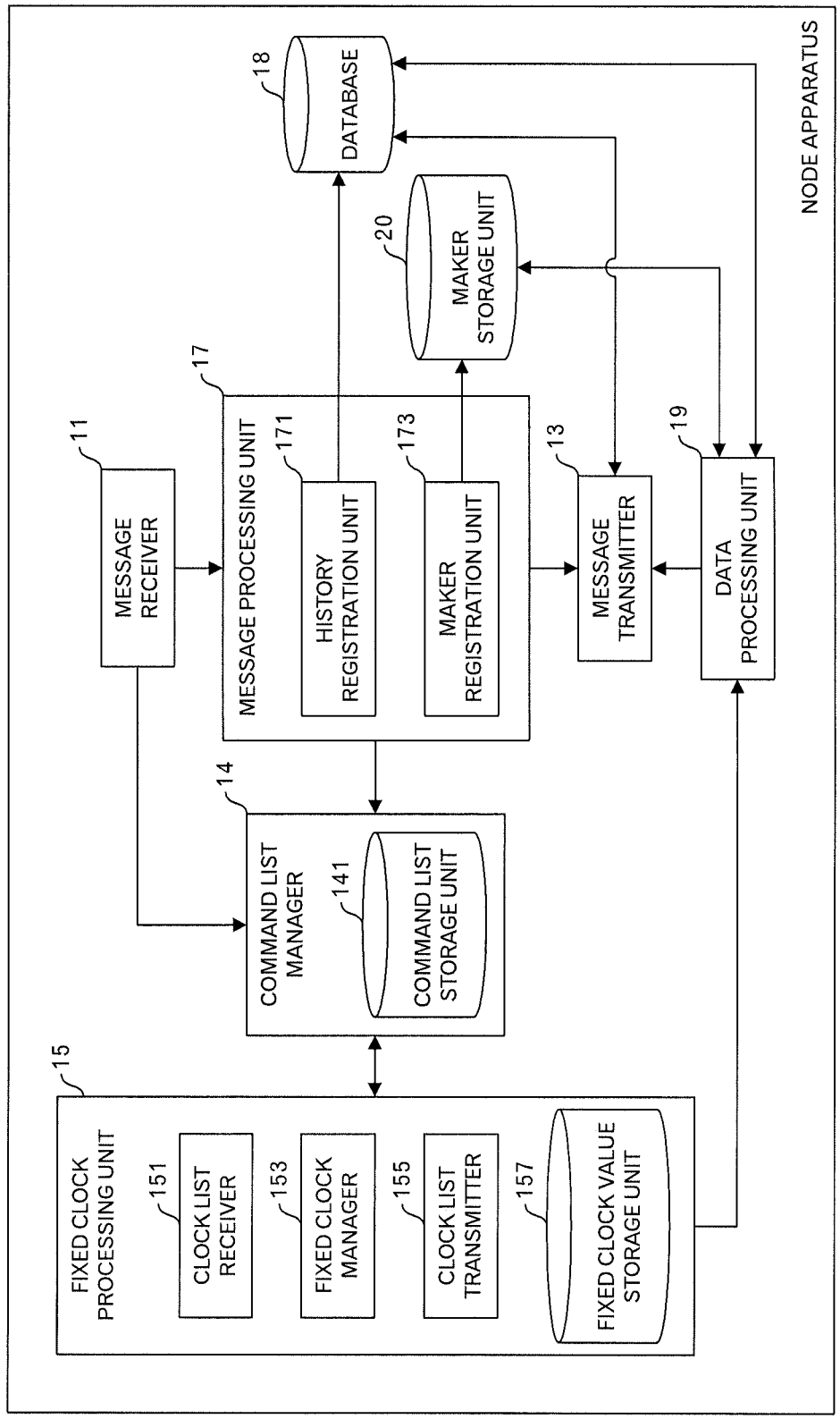
FIG. 32 is a functional bock diagram of a node apparatus in a fourth embodiment.

FIG. 32 is a function block diagram of anode apparatus of this embodiment The system configuration in this embodiment is the same as that of the system configuration illustrated in FIG. 7. A node apparatus relating to this embodiment has a message receiver 11, a message transmitter 13, a command list manager 14, a fixed clock processing unit 15, a message processing unit 17, a database 18, a data processing unit 19 and a marker storage unit 20. Except for having the marker storage unit 20, the node apparatus is basically the same as that of the third embodiment. However, in this embodiment, the marker registration unit 173 registers the first marker into the marker storage unit 20. Moreover, the data processing unit 19 carries out a processing using data stored in the fixed clock value storage unit 157, database 18 and marker storage unit 20.

Next, the processing by the overall distributed processing system in this embodiment will be explained using FIGS. 33A to 33D and FIGS. 34A to 34D. For example, it is assumed that history elements are stored in the distributed processing system as illustrated in FIG. 33A. In FIG. 33A, the four history elements {1, t=0}, {2, t=2}, {3, t=3} and {4, t=4} are stored in storage area A in order from the bottom. Moreover, the four history elements {11, t=0}, {12, t=2}, {13, t=3} and {14, t=6} are stored in storage area B in order from the bottom. Furthermore, the two history elements {21, t=0} and {22, t=2} are stored in storage area C in order from the bottom. Here, it is assumed that a certain node apparatus is in charge of the records A to C.

For example, in the state illustrated in FIG. 33A, when a reference request for referencing plural data values is received at time t=7, the marker registration units 173 of the respective node apparatuses cooperate with each other to register a first marker {snapshot, t=7} into the marker storage unit 20 as illustrated in FIG. 33B.

For example, it is assumed that one of the node apparatuses receives a set command "set (key=C, 24)" at time t=6, and receives a set command "set (key=B, 15)" at time t=8. As a result, the history registration unit 171 registers history elements into the database 18. For example, as illustrated in FIG. 33C, the history element {24, t=6} is placed at the very top in the storage area C, and the history element {15, t=8} is placed at the very top in the storage area B.

Figure 34A:
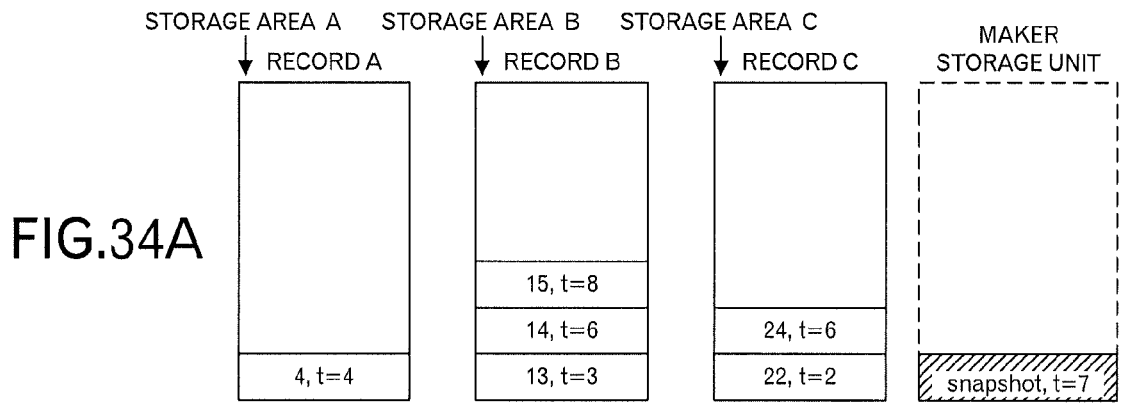
FIGS. 34A to 34D are diagrams to explain the processing of the entire distributed processing system relating to the fourth embodiment.

After that, it is assumed that data is fixed up to the time t=4. In other words, "4" is identified as the fixed clock value of the entire system. In this case, the data processing unit 19 identifies (or calculates) data values at the time t=4 from the history elements stored in the database 18. For example, as illustrated in FIG. 33D, as for the record A, the four history elements {1, t=0}, {2, t=2}, {3, t=3} and {4, t=4} among the history elements that are stored in the storage area A correspond to the fixed portion, and "4" is identified as the data value of the key A at time t=4 from the history elements of this fixed portion. Moreover, as for record B, the three history elements {11, t=0}, {12, t=2} and {13, t=3} among the history elements that are stored in the storage area B correspond to the fixed portion, and "13" is identified as the data value of the key B at time t=4 from the history elements of this fixed portion. Furthermore, as for record C, the two history elements {21, t=0} and {22, t=2} among the history elements that are stored in the storage area C correspond to the fixed portion, and "22" is identified as the data value of the key C at time t=4 from the history elements of this fixed portion. In the storage area A, as long as the history element {4, t=4} is saved, the history elements that are stored underneath that history element can be deleted. Similarly, in the storage area B, as long as the history element {13, t=3} is saved, the history elements that are stored underneath that history element can be deleted. Furthermore, in the storage area C, as long as the history element {22, t=2} is saved, the history elements that are stored underneath that history element can be deleted. Therefore, the data processing unit 19 deletes the three history elements {1, t=0}, {2, t=2} and {3, t=3} from the storage area A, deletes the two history elements {11, t=0} and {12, t=2} from the storage area B and deletes the history element {21, t=0} from the storage area C. After these history elements have been deleted, the contents in each of the storage areas become as illustrated in FIG. 34A.

Figure 34B:
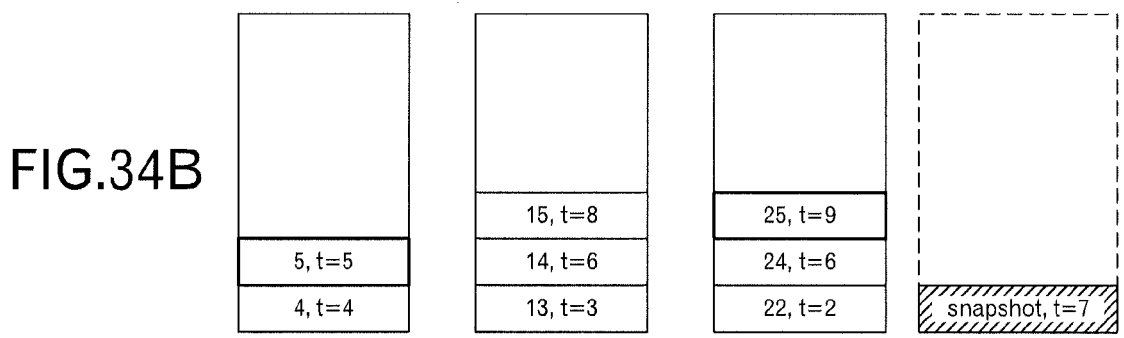

Also, for example, it is assumed that one of the node apparatuses receives a set command "set (key=A, 5)" at time t=5, and receives a set command "set (key=C, 25)" at time t=9. As a result, the history registration unit 171 registers the history elements into the database 18. For example, as illustrated in FIG. 34B, in the storage area A, the history element {5, t=5} is placed at the very top, and in the storage area C, the history element {25, t=9} is placed at the very top.

Figure 34C:
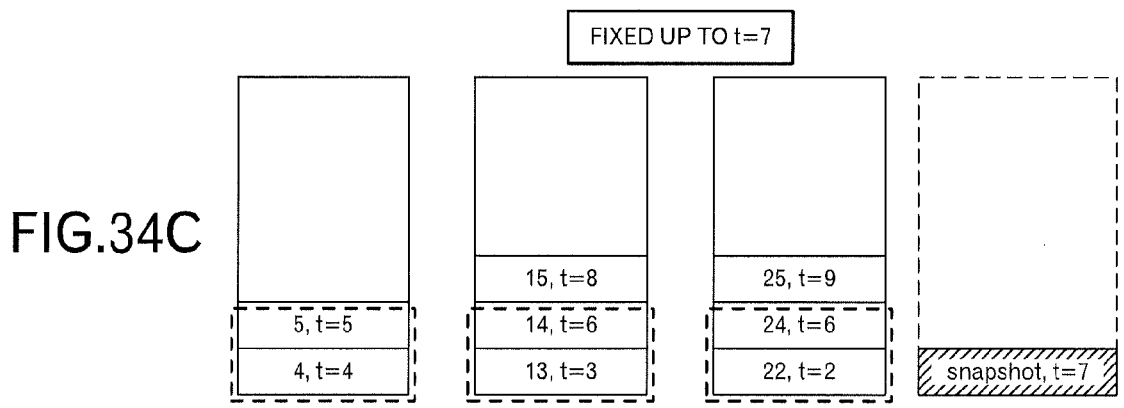
Figure 34D:
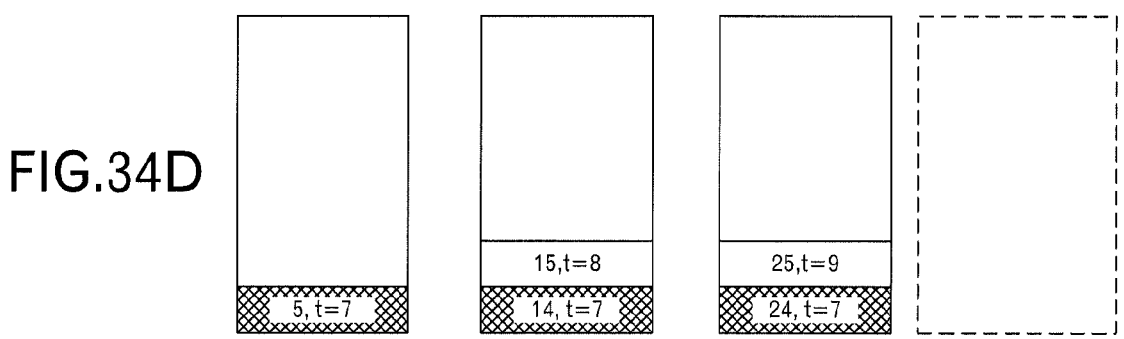

After that, it is assumed that the fixed clock value of the entire system becomes equal to or greater than the logical clock value included in the marker. In this case, the data processing unit 19 compares the fixed clock value of the entire system, which is stored in the fixed clock value storage unit 157, with the logical clock value that is included in the first marker stored in the marker storage unit 20, and, in this case, determines that the fixed clock value of the entire system has become equal to or greater than the logical clock value included in the marker. Here, it is assumed that the fixed clock value of the entire system has become "7" As a result, the data processing unit 19 identifies, in the storage area in the database 18, the history elements that include a logical clock value that is equal to or less than the logical clock value that is included in the first marker, and identifies (or calculates) the data values at the time represented by the logical clock value that is included in the first marker from the identified history elements. As illustrated in FIG. 34C, as for the record A, the two history elements {4, t=4} and {5, t=5} are identified in the storage area A, and "5" is identified as the data value of the key A at the time t=7 from these two history elements. Moreover, as for the record B, the two history elements {13, t=3} and {14, t=6} are identified in the storage area B, and "14" is identified as the data value of the key B at the time t=7 from these two history elements. Furthermore, as for the record C, the two history elements {22, t=2} and {24, t=6} are identified in the storage area C, and "24" is identified as the data value of the key C at the time t=7 from these two history elements. The data processing unit 19 then registers second markers that include the logical clock value included in the first marker, and the identified (or calculated) data values into the respective storage areas in the database 18. Here, the second marker {5, t=7} is registered into the storage area A, the second marker {14, t=7} is registered into the storage area B, and the second marker {24, t=7} is registered into the storage area C. The data processing unit 19 then deletes history elements that include a logical clock that is equal to or less than the logical clock included in the second markers from each storage area. This is because as long as the history elements that include a logical clock that is equal to or less than the logical clock included in the second markers are deleted after the second markers have been registered, there is no problem. The data processing unit 19 also deletes the first marker from the marker storage unit 20. After the second markers have been registered in the respective storage areas, the history elements that include a logical clock that is equal to or less than the logical clock included in the second markers have been deleted from the respective storage areas, and the first marker has been deleted from the marker storage unit 20, the contents in each of the storage areas become as illustrated in FIG. 34D. In FIG. 34D, only the second marker {5, t=7} is stored in the storage area A. Moreover, the second marker {14, t=7} and the history element {15, t=8} are stored in the storage area B. Furthermore, the second marker {24, t=7} and the history element {25, t=9} are stored in the storage area C.

Figure 35:
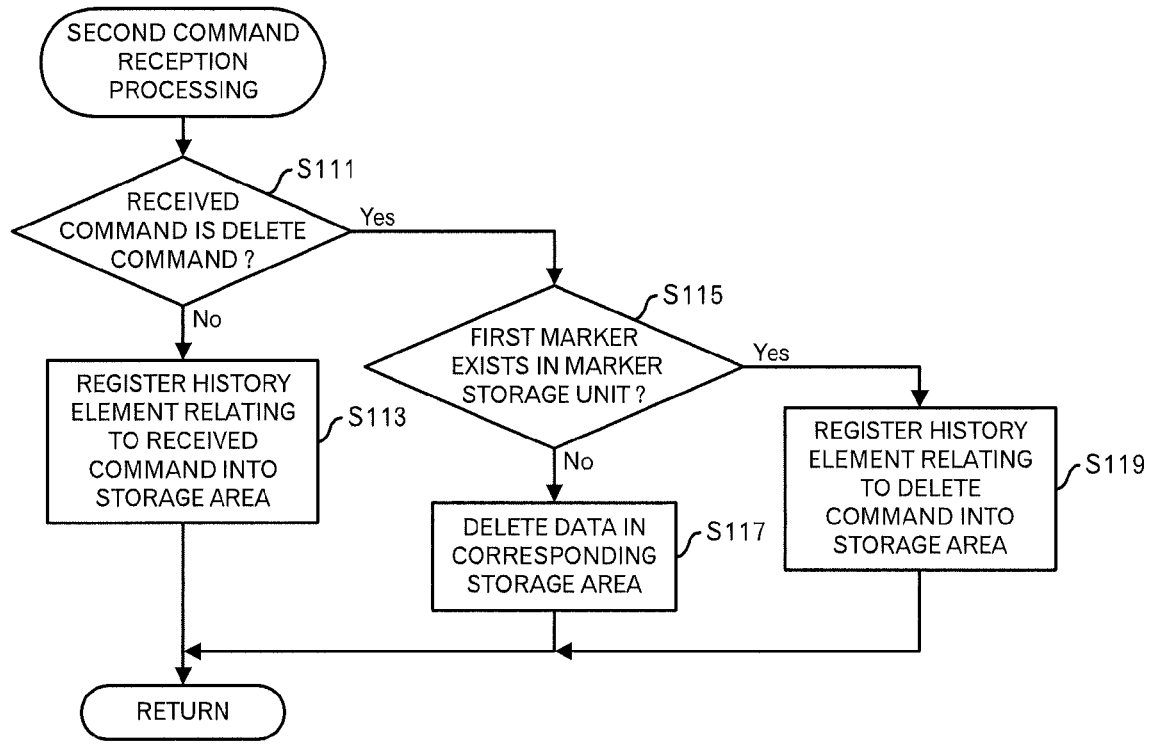
FIG. 35 is a diagram depicting a processing flow of a second command reception processing.
Figure 36:
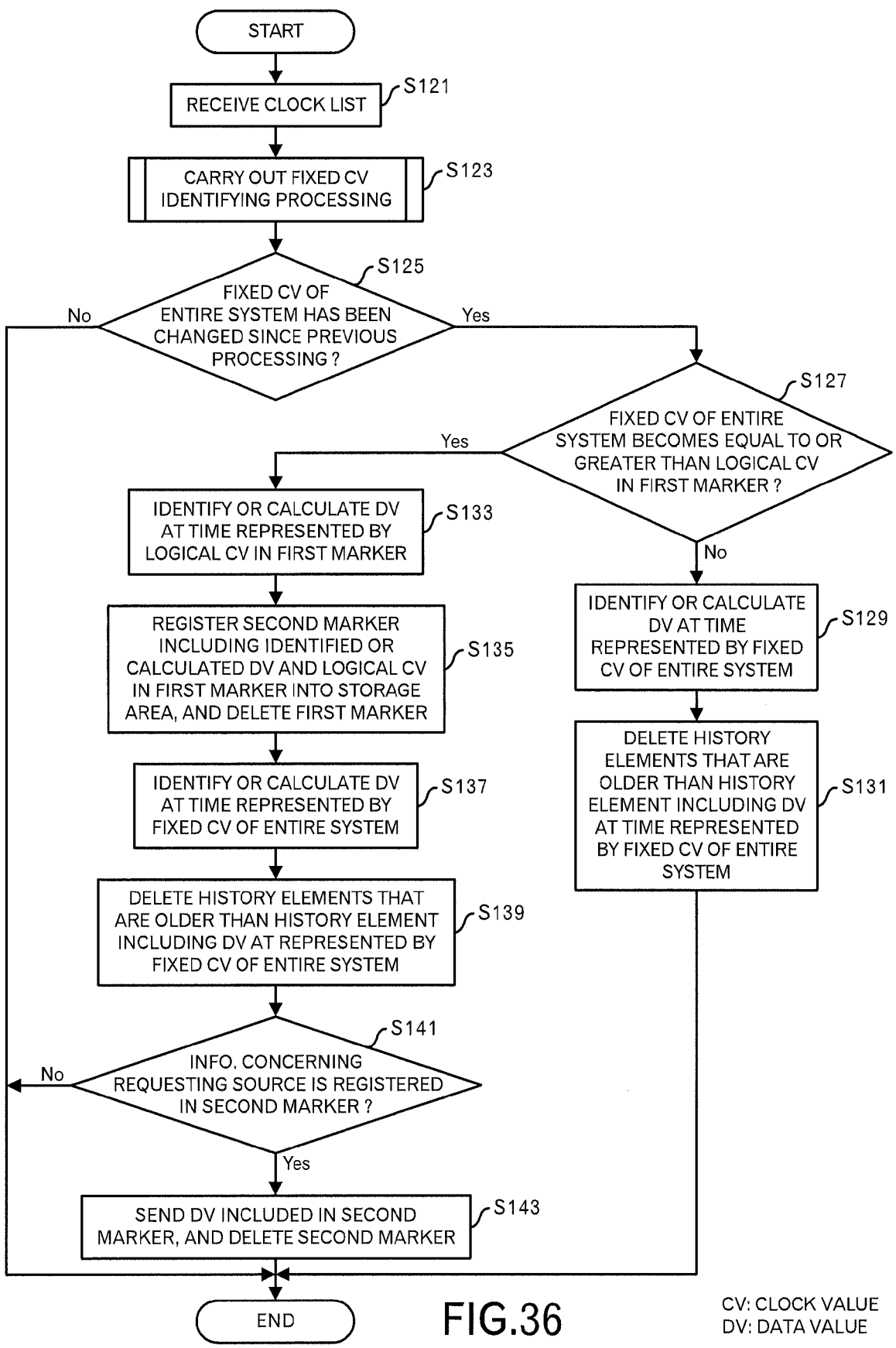
FIG. 36 is a diagram depicting a processing flow when the node apparatus executes the clock list reception processing.

The processing flow of a node apparatus in this embodiment is basically the same as that explained in the third embodiment. However, in this embodiment, at the step S53 (FIG. 29), instead of the command reception process illustrated in FIG. 30, a processing such as illustrated in FIG. 35 (hereafter, call the second command reception processing) is carried out. Moreover, in this embodiment, instead of the processing illustrated in FIG. 31, a processing such as illustrated in FIG. 36 is carried out. The processing flow of FIG. 35 and FIG. 36 will be explained below.

First, the processing flow of the second command reception process (FIG. 35) will be explained. First, the message processing unit 17 determines whether or not the received command is a delete command (FIG. 35: step S111). When the received command is not a delete command (step S111: NO route), the history registration unit 171 of the message processing unit 17 registers a history element relating to the received command into the corresponding storage area in the database 18 according to the time stamp (step S113). After that, the processing ends and returns to the calling source processing. The processing of the step S111 and step S113 is the same as the processing of the step S61 and step S63 (FIG. 30).

On the other hand, when it is determined that the received command is a delete command (step S111: YES route), the history registration unit 171 determines whether or not there is a first marker registered in the marker storage unit 20 (step S115). When there is no first marker registered in the marker storage unit 20 (step S115: NO route), the history registration unit 171 deletes data (in other words, history elements) in the corresponding storage area (step S117). In other words, the history registration unit 171 deletes data in the storage area that corresponds to the record designated by the delete command. After that, the processing ends, and returns to the calling source processing.

On the other hand, when there is a first marker registered in the marker storage unit 20 (step S115: YES route), the history registration unit 171 registers a history element relating to the delete command in the corresponding storage area (step S119). After that, the processing ends, and returns to the calling source processing.

Next, the processing flow illustrated in FIG. 36 will be explained. FIG. 36 illustrates the processing flow when receiving a clock list. First, the clock list receiver 151 of the fixed clock processing unit 15 receives a clock list from another node apparatus (FIG. 36: step S121), and outputs the received clock list to the fixed clock manager 153. The fixed clock manager 153 receives the clock list from the clock list receiver 151, and carries out a processing to identify the fixed clock value (step S123). By carrying out the processing to identify the fixed clock value, the fixed clock value of the entire system is identified and stored into the fixed clock value storage unit 157. The processing for identifying the fixed clock value is the same as the processing explained in the first embodiment, so a detailed explanation here is omitted.

After that, the data processing unit 19 uses the data stored in the fixed clock value storage unit 157 to determine whether or not the fixed clock value of the entire system has changed since the previous processing (step S125). For example, the fixed clock value at the time when the processing of this step was performed the previous time is saved, and by comparing the fixed clock value of the entire system at the current point in time with the fixed clock value of the entire system at the time of the previous processing, the data processing unit 19 determines whether or not there was a change in the fixed clock value of the entire system. When the fixed clock value of the entire system has not changed since the time of the previous processing (step S125: NO route), the processing explained below is skipped, and ends. The processing from the step S121 to step S125 is the same as the processing from the step S81 to step S85 (FIG. 31).

On the other hand, when the fixed clock value of the entire system has changed since the time of the previous processing (step S125: YES route), the data processing unit 19 uses the data stored in the fixed clock value storage unit 157 and the marker storage unit 20 to determine whether or not the fixed clock value of the entire system has become equal to or greater than the logical clock value that is included in the first marker (step S127). The processing of this step is basically the same as the processing of the step S87 (FIG. 31), however in this embodiment, the first marker is stored in the marker storage unit 20, so at this step, data that is stored in the marker storage unit 20 is used instead of data stored in the database 18.

When the fixed clock value of the entire system is less than the logical clock value that is included in the first marker (step S127: NO route), the processing moves to the processing of step S129. The data processing unit 19 then uses the data stored in the database 18 to identify or calculate the data values at the time represented by the fixed clock value of the entire system (step S129). The data processing unit 19 then deletes history elements that are older than the history element that includes the data value at the time represented by the fixed clock value of the entire system from the storage area in the database 18 (step S131). After that, the processing ends. Incidentally, the processing of the step S129 and step S131 is the same as the processing of the step S89 and step S91 (FIG. 31).

On the other hand, when the fixed clock value of the entire system has become equal to or greater than the logical clock value that is included in the first marker (step S127: YES route), the processing move to the processing of step S133. The data processing unit 19 then uses the data stored in the database 18 and in the marker storage unit 20 to identify or calculate the data values at the time represented by the logical clock value that is included in the first marker (step S133). More specifically, as was explained using FIG. 34C, the data processing unit 19 identifies, in the storage area in the database 18, history elements including logical clock values that are equal to or less than the logical clock value included in the first marker, and identifies or calculates the data value at the time represented by the logical clock value that is included in the first marker from the identified history elements. When there are plural records that the node apparatus is in charge of, the data value at the time represented by the logical clock value included in the first marker are identified or calculated for each record. The data processing unit 19 then registers the second marker that includes the identified or calculated data value and the logical clock value that is included in the first marker into the storage area in the database 18, and deletes the first marker from the marker storage unit 20 (step S135). When there are plural records that the node apparatus is in charge of, N storage areas (N is equal to the number of records) are secured in the database 18. Therefore, the second markers are registered into the respective storage areas. In this case, data values are identified and calculated for each record at the step S133. Therefore, for example, a second marker that includes a data value relating to the record A is registered into the storage area for the record A, and a second marker that includes a data value relating to the record B is registered into the storage area for the record B. The data processing unit 19 then uses the data stored in the database 18 to identify or calculate the data value at the time represented by the fixed clock value of the entire system (step S137). The data processing unit 19 then deletes history elements that are older than the history element that includes data value at the time represented by the fixed clock value of the entire system from the storage area in the database 18 (step S139).

The data processing unit 19 then determines whether or not information concerning the requesting source of the reference request is included in the second marker that is stored in the storage area in the database 18 (step S141). When no information concerning the requesting source of the reference request is included in the second marker (step S141: NO route), step S143 explained below is skipped, and the processing ends. In this case, the second marker is saved at least until the data values are transmitted to the requesting source of the reference request.

On the other hand, when information concerning the requesting source of the reference request is included in the second marker (step S141: YES route), the data processing unit 19 instructs the message transmitter 13 to transmit the data values included in that second marker. The message transmitter 13 identifies the second marker that includes information concerning the requesting source of the reference request in the storage area in the database 18 in response to the instruction from the data processing unit 19, then transmits the data value included in the identified second marker to the requesting source of the reference request, and deletes the identified second marker from the storage area in the database 18 (step S143). Instead of deleting the second marker at the step S143, the second marker may be deleted later at arbitrary timing. After that, the processing ends. Incidentally, the processing from the step S137 to step S143 is the same as the processing from the step S97 to step S103 (FIG. 31).

By carrying out the processing described above, even when managing a first marker in an area separate from the storage areas for storing history elements, it is possible to know the data values at the time represented by a specific logical clock value in the same way as in third embodiment.

Although the embodiments of the present technique were explained above, the present technique is not limited to these. For example, the function block diagrams of the node apparatuses illustrated in FIG. 8, FIG. 16, FIG. 21 and FIG. 32 are mere examples, and the actual program module configuration may not always correspond to these. Similarly, the data structure in the data storage units are just examples. As for the processing flow as well, as long as the processing result does not change, the order of the processing can be changed. Furthermore, plural steps may be executed in parallel.

Figure 37:
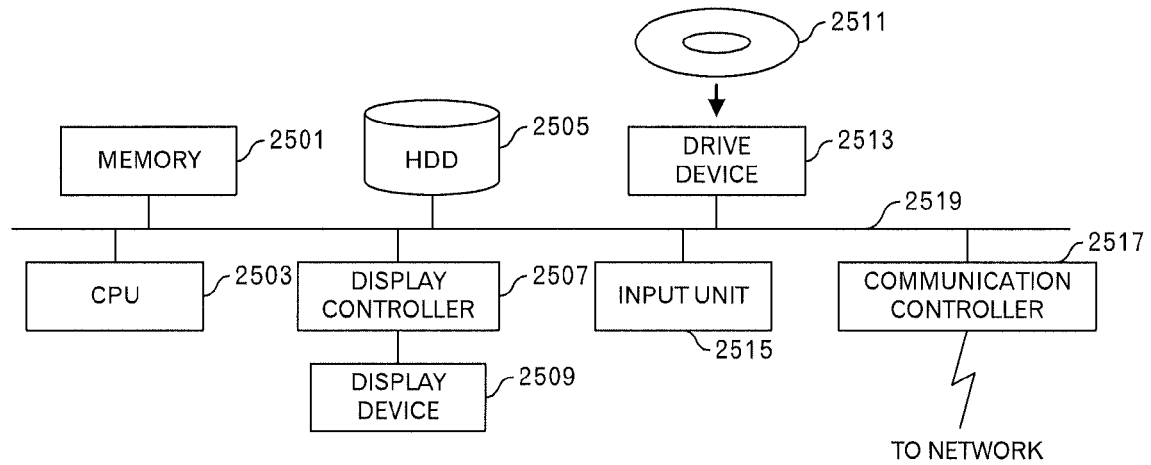
FIG. 37 is a functional block diagram of a computer.

In addition, the node apparatus is a computer device as shown in FIG. 37. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 37. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized. Incidentally, the database 16 in FIG. 8 may be implemented using the memory 2501 and/or HDD 2505 in FIG. 37. Similarly, the command list storage unit 141 and fixed clock value storage unit 157 in FIGS. 8, 21 and 32, the first and second storage units 1505 and 1507 in FIG. 16, the database 18 in FIGS. 21 and 32, and the marker storage unit 20 in FIG. 32 may be implemented using the memory 2501 and/or HDD 2505. The history element registration unit 1501, marker registration unit 1503 and data identifying unit 1509 in FIG. 16 may be implemented by a combination of the processor 2503 and programs, namely, by the processor 2505 executing the programs. More specifically, by the processor 2503 operating according to the programs stored in the HDD 2505 or memory 2501, the aforementioned processing units may be realized. The message receiver 11, message processing unit 12, message transmitter 13, command list manager 14, fixed clock processing unit 15, message processing unit 17, data processing unit 19, clock list receiver 151, fixed clock manager 153, clock list transmitter 155, history registration unit 171 and marker registration unit 173 in FIG. 8, 21 or 32 may be implemented, similarly.

The aforementioned embodiments can be outlined as follows:

A data management method relating to the embodiments is a data management method executed by a node apparatus managing a data value corresponding to each of plural data values. Moreover, this data management method includes: upon receipt of a predetermined command relating to an assigned key that is a key of which the node apparatus is in charge among a plurality of keys, first registering, into a first storage unit, a history element including a first logical clock value at a first time when the predetermined command was received, and a data value at a second time represented by the first logical clock value or information concerning the predetermined command; upon receipt of a reference request to reference a data value at a third time represented by a specific logical clock value, second registering, into the first storage unit or a second storage unit different from the first storage unit, a first marker that includes, as the specific logical clock value, a second logical clock value at a fourth time when the reference request was received or a third logical lock value designated by the reference request, and further includes information concerning the reference request; and upon detecting that a fixed logical clock value in a system to which the node apparatus belongs becomes equal to or greater than the specific logical clock value included in the first marker stored in the first storage unit or the second storage unit, identifying a data value corresponding to the assigned key at the third time from the history elements including first logical clock values that are equal to or less than the specific logical clock value in the first storage unit.

By registering the first marker in this way, it becomes possible to determine whether or not the a data value at a time represented by the specific logical clock value is fixed, according to whether or not the fixed clock value in the entire distributed processing system becomes equal to or greater than the specific logical clock value included in the first marker. Then, when the logical clock value is fixed up to the time represented by the specific logical clock value, the data value at the time represented by the specific logical clock value is identified from appropriate history elements. Thus, it becomes possible to grasp the data values at a time represented by the specific logical clock value.

In addition, the data management method may further include: after the identifying, deleting history elements including first logical clock values that are equal to or less than the specific logical clock value included in the first marker. This is because there is no problem as long as the history elements are deleted, which include the logical clock values that are equal to or less than the specific logical clock value after the data value at the time represented by the specific logical clock value included in the first marker is identified.

Furthermore, the data management method may further include: upon detecting that the predetermined command is a delete command to delete data, determining whether or not the first marker is registered in the first storage unit or the second storage unit; and upon determining that the first marker is registered, holding the history elements in the first storage unit until the data value at the third time is identified in the identifying. According to this processing, even when the delete command is received, the history elements are not deleted when the first marker is registered. Therefore, as described above, the data value at the time represented by the specific logical clock value included in the first marker can be identified.

Moreover, the data management method may further include: transmitting the data value identified in the identifying to a transmission source of the reference request after the identifying. Thus, when the respective node apparatuses replies with the identified data value to the transmission source of the reference request, it is possible to easily collect plural data values at the time represented by the specific logical clock value.

Furthermore, the identifying may include: changing the first marker that was registered in the first storage unit to a second marker including the specific logical clock value included in the first marker and the data value corresponding to the assigned key at the third time. In addition, the second marker may be held in the first storage unit until a predetermined timing. For example, when a response to the reference request is not replied with immediately, the data value is held until an acquiring request of the data value is received.

In addition, the identifying may include: registering, into the first storage unit, a second marker including the specific logical clock value included in the first marker that is registered in the second storage unit and the data value corresponding to the assigned key at the third time. The second marker may be held in the first storage unit until a predetermined timing. Incidentally, after registering the second marker, the first marker may be deleted from the first storage unit.

Furthermore, in the first registering, the history element relating to the assigned key may be stored in order of the first logical clock value in the first storage unit, and in the second registering, the first marker may be inserted at a position identified by the specific logical clock value included in the first marker among the history elements stored in the first storage unit. Thus, by storing the logical clock values sequentially, it becomes possible to easily identify the history elements including the logical clock values that are equal to or less than the specific logical clock value included in the first marker, and it is also possible to easily manage the data.

A node apparatus relating to the embodiments includes: a first storage unit; a history element registration unit to register, upon receipt of a predetermined command relating to an assigned key that is a key of which the node apparatus is in charge among a plurality of keys, a history element including a first logical clock value at a first time when the predetermined command was received, and a data value at a second time represented by the first logical clock value or information concerning the predetermined command, into the first storage unit; a marker registration unit to register, upon receipt of a reference request to reference a data value at a third time represented by a specific logical clock value, second registering, a first marker that includes, as the specific logical clock value, a second logical clock value at a fourth time when the reference request was received or a third logical lock value designated by the reference request, and further includes information concerning the reference request, into the first storage unit or a second storage unit different from the first storage unit; and a data identifying unit to identify, upon detecting that a fixed logical clock value in a system to which the node apparatus belongs becomes equal to or greater than the specific logical clock value included in the first marker stored in the first storage unit or the second storage unit, a data value corresponding to the assigned key at the third time from the history elements including first logical clock values that are equal to or less than the specific logical clock value in the first storage unit.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a node apparatus to execute a procedure, the procedure comprising:
 upon receipt of a predetermined command relating to an assigned key that is a key of which the node apparatus is in charge among a plurality of keys, first registering, into a first storage unit, a history element including a first logical clock value at a first time when the predetermined command was received, and a data value at a second time represented by the first logical clock value or information concerning the predetermined command;
 upon receipt of a reference request to reference a data value at a third time represented by a specific logical clock value, second registering, into the first storage unit or a second storage unit different from the first storage unit, a first marker that includes, as the specific logical clock value, a second logical clock value at a fourth time when the reference request was received or a third logical lock value designated by the reference request, and further includes information concerning the reference request; and upon detecting that a fixed clock value in a system to which the node apparatus belongs becomes equal to or greater than the specific logical clock value included in the first marker stored in the first storage unit or the second storage unit, identifying a data value corresponding to the assigned key at the third time from the history elements including first logical clock values that are equal to or less than the specific logical clock value in the first storage unit.

2. The computer-readable, non-transitory storage medium as set forth in claim 1, wherein the procedure further comprises:

after the identifying, deleting history elements including first logical clock values that are equal to or less than the specific logical clock value included in the first marker.

3. The computer-readable, non-transitory storage medium as set forth in claim 1, wherein the procedure further comprises:

upon detecting that the predetermined command is a delete command to delete data, determining whether or not the first marker is registered in the first storage unit or the second storage unit; and upon determining that the first marker is registered, holding the history elements in the first storage unit until the data value at the third time is identified in the identifying.

4. The computer-readable, non-transitory storage medium as set forth in claim 1, wherein the procedure further comprises:

transmitting the data value identified in the identifying to a transmission source of the reference request after the identifying.

5. The computer-readable, non-transitory storage medium as set forth in claim 1, wherein the identifying comprises:

changing the first marker that was registered in the first storage unit to a second marker including the specific logical clock value included in the first marker and the data value corresponding to the assigned key at the third time, and wherein the second marker is held in the first storage unit until a predetermined timing.

6. The computer-readable, non-transitory storage medium as set forth in claim 1, wherein the identifying comprises:

registering, into the first storage unit, a second marker including the specific logical clock value included in the first marker that is registered in the second storage unit and the data value corresponding to the assigned key at the third time, and wherein the second marker is held in the first storage unit until a predetermined timing.

7. The computer-readable, non-transitory storage medium as set forth in claim 1, wherein, in the first registering, the history element relating to the assigned key is stored in order of the first logical clock value in the first storage unit, and in the second registering, the first marker is inserted at a position identified by the specific logical clock value included in the first marker among the history elements stored in the first storage unit.

8. A data management method executed by a node apparatus, the data management method comprising:

upon receipt of a predetermined command relating to an assigned key that is a key of which the node apparatus is in charge among a plurality of keys, first registering, into a first storage unit, by the node apparatus, a history element including a first logical clock value at a first time when the predetermined command was received, and a data value at a second time represented by the first logical clock value or information concerning the predetermined command;

upon receipt of a reference request to reference a data value at a third time represented by a specific logical clock value, second registering, into the first storage unit or a second storage unit different from the first storage unit, by the node apparatus, a first marker that includes, as the specific logical clock value, a second logical clock value at a fourth time when the reference request was received or a third logical lock value designated by the reference request, and further includes information concerning the reference request; and upon detecting that a fixed clock value in a system to which the node apparatus belongs becomes equal to or greater than the specific logical clock value included in the first marker stored in the first storage unit or the second storage unit, identifying, by the node apparatus, a data value corresponding to the assigned key at the third time from the history elements including first logical clock values that are equal to or less than the specific logical clock value in the first storage unit.

9. A node apparatus comprising:

a first storage unit;

a processor to execute a procedure, the procedure including:

registering, upon receipt of a predetermined command relating to an assigned key that is a key of which the node apparatus is in charge among a plurality of keys, a history element including a first logical clock value at a first time when the predetermined command was received, and a data value at a second time represented by the first logical clock value or information concerning the predetermined command, into the first storage unit;

registering, upon receipt of a reference request to reference a data value at a third time represented by a specific logical clock value, second registering, a first marker that includes, as the specific logical clock value, a second logical clock value at a fourth time when the reference request was received or a third logical lock value designated by the reference request, and further includes information concerning the reference request, into the first storage unit or a second storage unit different from the first storage unit; and identifying, upon detecting that a fixed clock value in a system to which the node apparatus belongs becomes equal to or greater than the specific logical clock value included in the first marker stored in the first storage unit or the second storage unit, a data value corresponding to the assigned key at the third time from the history elements including first logical clock values that are equal to or less than the specific logical clock value in the first storage unit.

* * * * *